United States Patent
Lozhkin

(10) Patent No.: US 7,634,018 B2
(45) Date of Patent: Dec. 15, 2009

(54) WIRELESS COMMUNICATION APPARATUS

(75) Inventor: Alexander Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/362,048

(22) Filed: Feb. 27, 2006

(65) Prior Publication Data

US 2007/0121752 A1 May 31, 2007

(30) Foreign Application Priority Data

Nov. 28, 2005 (JP) .............................. 2005-341648

(51) Int. Cl.
*H04L 1/02* (2006.01)
*H04B 7/02* (2006.01)

(52) U.S. Cl. ...................... 375/267; 375/316; 375/340; 375/347

(58) Field of Classification Search .................. 375/267, 375/316, 340, 347
See application file for complete search history.

(56) References Cited

U.S. PATENT DOCUMENTS

| | | | |
|---|---|---|---|
| 7,248,647 B2 * | 7/2007 | Claussen et al. ............. | 375/308 |
| 7,317,770 B2 * | 1/2008 | Wang .......................... | 375/340 |
| 7,376,196 B2 * | 5/2008 | Lozhkin et al. .............. | 375/265 |
| 2005/0163241 A1 | 7/2005 | Lozhkin | |

FOREIGN PATENT DOCUMENTS

EP 1 724 958 A2 10/2005

OTHER PUBLICATIONS

Claussen Holger, et al. "Layered encoding for 16-and 64-QAM iterative MIMO receivers"; Proceedings of European Personal And Mobile Communications Conference; XX, XX ; Apr. 22, 2003; pp. 511-515; XP002374358.
A. van Zelst, "Space Division Muliplexing Algorithms," $10^{th}$ Mediterranean Electrotechnical Conference 2000, *MELECON 2000*, Cyprus, May 2000, vol. 3, pp. 1218-1221.
R. van Nee, et al., "Maximum Likelihood Decoding in a Space Division Multiplexing System," *Proc. of IEEE Vehicular Technology Conference (VTC) 2000*, Tokyo 2000.
Y. Akaiwa, *Introduction to Digital Mobile Communication*, New York: John Wiley & Sons, Inc., pp. 80-81, Oct. 31, 1997.

* cited by examiner

*Primary Examiner*—Ted M Wang
(74) *Attorney, Agent, or Firm*—Hanify & King, PC

(57) ABSTRACT

In a wireless receiving apparatus, comprising a plurality of antennas and a plurality of receivers each of which is provided for each antenna, each receiver uses a received signal that was received by the receiving antenna that is connected to it, and received signals that were received by the other receiving antennas, to calculate probability of a signal that was transmitted from a specified transmitter, and judges the signal that was transmitted from the transmitter based on that probability. The receivers calculate the probability using an equation that calculates the probability based on the posteriori probability that the signal transmitted from the transmitter is +1, and the posteriori probability that the signal transmitted from the transmitter is −1.

5 Claims, 9 Drawing Sheets

(A)

(B)

(A)

(B)

(A)

(B)

WIRELESS COMMUNICATION APPARATUS

BACKGROUND OF THE INVENTION

This invention relates to a wireless communication apparatus, and more particularly to a MIMO (Multiple-Input Multiple-Output)-capable wireless communication apparatus in a transmission system comprising a MIMO configuration.

Among current wireless communication systems, there is increasing interest in space division multiplexing transmission technologies (MIMO transmission systems) in which, by transmitting different data streams in parallel from a plurality of transmission antennas, the transmission capacity can be increased in proportion to the number of transmission antennas. The main feature of a MIMO system is its capability to utilize a multipass so that it becomes advantageous to the user, and effectively takes advantage of the strong points of random fading and multipass delay dispersion (when it can be used).

In a MIMO transmission system, normally signal processing to subtract replicas that occur is employed to remove the interference by other data streams from a data stream of interest (V-BLAST, MSSE-VBLAST, Zero-Forced V-BLAST). These methods can be executed with suitable complexity, however, the BER result is very inferior compared with that from MLD (Maximum Likelihood Decoding).

An iterative MAP receiver (turbo receiver) performs iterative maximum likelihood estimation. This technology provides better BER results than V-BLAST, MSSE-VBLAST or Zero-Forced V-BLAST, and that are very close to BER results by MLD. However, a turbo receiver has its weak points. The main weak point is that it is necessary perform turbo iterative operation a plurality of times before performing final determination for the received signal. The nature of the iterative operations performed by the turbo receiver makes computation complicated, and increases the decoding time.

The receiver of this invention (Single Shot SS receiver) is based on a parallel maximum a posteriori probabilities estimation algorithm, and does not require iterative computation. In the SS receiver of this invention, in order to increase the judgment speed for a plurality of soft-judgment results derived from one data stream, all of the receivers execute computation in parallel.

FIG. 1 shows the configuration of a MIMO system, where TRX is a transmission station and REC is a receiver station.

Data streams $D_0$ to $D_{M-1}$ of the same number as the number of transmission antennas M pass through data modulation, D/A conversion, quadrature modulation, frequency up-conversion, and other processing by respective transmission apparatus $TRX_0$ to $TRX_{M-1}$, and are transmitted from the respective transmission antennas $ATT_0$ to $ATT_{M-1}$. Signals transmitted from the antennas $ATT_0$ to $ATT_{M-1}$ pass through independent fading channels $h_{nm}$ (m=0 to M−1, n=0 to N−1), and after space division multiplexing, are received by N receiving antennas $ATR_0$ to $ATR_{N-1}$. Signals received by the receiving antennas pass through frequency down-conversion, quadrature detection, A/D conversion and other processing by receiving apparatus $REC_0$ to $REC_{N-1}$, and received data streams $y_0$ to $y_{N-1}$ are generated. Each of these received data streams is in the form of M multiplexed transmitted data streams, so that by performing signal processing of all received data streams, the transmitted data streams are separated and reproduced.

Algorithms for signal processing to separate transmitted data streams $D_0$ to $D_{M-1}$ from received signals include such linear algorithms as ZF (Zero-Forcing) and MMSE which use the inverse matrix of a channel correlation matrix (see non-patent document 1), and non-linear algorithms of which BLAST (Bell Laboratories Layered Space-Time) is representative. In addition, there are also methods, such as MLD (Maximum Likelihood Decoding), which do not use operations on the inverse matrix of a correlation matrix (see non-patent document 2).

ZF (Zero-Forcing) Algorithm

If a transmitted data stream is represented by an M-dimensional complex matrix, and a received data stream is represented by an N-dimensional complex matrix, then the relation of the following equation occurs.

$$Y = H \cdot D \quad (1)$$

$$H = \begin{bmatrix} h_{00} \cdot h_{01} & \cdots & h_{0M-1} \\ h_{10} & \cdots & h_{1M-1} \\ & \cdots & \\ h_{N-10} & \cdots & h_{N-1M-1} \end{bmatrix}$$

$$D = [D_0 \cdot D_1 \ \cdots \ D_{M-1}]^{-1}$$

$$Y = [y_0 \cdot y_1 \ \cdots \ y_{N-1}]^{-1}$$

The ZF (Zero-Forcing) algorithm uses the following equation to estimate the transmitted data stream.

$$\hat{D} = (H^* \cdot H)^{-1} H^* \cdot D = H^+ \cdot Y \quad (2)$$

Here, H*H is called the channel correlation matrix. $H^+$ denotes the pseudo-inverse matrix; and in order for this pseudo-inverse matrix to exist, it is necessary that $N \geq M$.

MMSE Algorithm

The MMSE (Minimum Mean Square Error) method is another linear estimation approach in which the transmitted data stream (received data vector) D is estimated based on the received data stream Y. In this MMSE algorithm, the following equation is used to determine the matrix G:

$$\epsilon^2 = E[(D-\hat{D})^*(D-\hat{D})] = [(D-G \cdot Y)^*(D-G \cdot Y)] \quad (3)$$

Then, the following equation is used to estimate the data stream D.

$$\hat{D} = (\alpha \cdot I + H^* \cdot H)^{-1} H^* \cdot Y \quad (4)$$

Here, $\alpha$ is the noise dispersion, and I is a matrix which depends on G. The ZF algorithm corresponds to the MMSE algorithm when $\alpha = 0$.

Decision Feedback Decoding

It is expected that if the most reliable element of the transmitted vector data D is decoded and used to improve decoding of the other elements, performance will be improved. This method is called symbol cancellation, and when combined with the ZF method and MMSE method, is known as ZF-VBL and MSSE-VBL.

MLD Algorithm

The MLD algorithm is a method that does not use operations in the inverse matrix of a correlation matrix, but uses the following equation to estimate the transmitted data stream (transmission vector) D.

$$\hat{D} = \arg \min \|Y - H \cdot D\|^2 \quad (5)$$

Here, if the number of signal constellations of modulated data input to M antennas is Q, then there exists $Q^M$ combinations of transmission vectors D. In QPSK, Q=4, in 16 QAM, Q=16, and in 64 QAM, Q=64. In the MLD algorithm, candidates (replicas) of the $Q^M$ transmission vectors are generated, and the operation of equation (5) is performed, and the replica for which the result is the smallest is estimated to be the input data.

Above, is the normal case in which the number of transmission antennas is M, and the number of receiver antennas is N, so when M=2 and N=2, Equation (1) becomes as shown below.

$$Y = H \cdot D, \quad (6)$$
$$H = \begin{bmatrix} h_{00} & h_{01} \\ h_{10} & h_{00} \end{bmatrix}, \quad D = \begin{bmatrix} D_0 \\ D_1 \end{bmatrix}, \quad Y = \begin{bmatrix} y_0 \\ y_1 \end{bmatrix}$$

The inventors have proposed a turbo receiver for a MIMO communication system that comprises: a transmission station that sends transmission using separate transmission antennas for two different data streams, and a receiving station that divides and outputs the data streams that have been multiplexed in space by signals that are received from the two antennas (see patent document 3).

FIG. 2 is a block diagram showing a MIMO communication system that comprises the turbo receiver proposed above, and as shown in (A) of FIG. 2, the transmission station TRX comprises two transmitters TRX0, TRX1 and two transmission antennas AT0, AT1, and the receiving station REC comprises two receiving antennas AR0, AR1 and two receivers (turbo receivers) REC0, REC1. As shown in (B) of FIG. 2, each of the receivers REC0, REC1 comprises a receiving unit RV and signal-processing unit PR, and the receiving unit RV performs processing such as data modulation, D/A conversion, quadrature conversion frequency up-conversion, and it inputs signals $y_0$, $y_1$ to the signal-processing unit PR, and the signal-processing unit PR determines the bit of the data stream.

Each transmitter TRX0, TRX1 performs QPSK or BPSK modulation and transmission of the information symbol Di (i=0, 1). The first transmitter TRX0 transmits a first data stream, and the second transmitter TRX1 transmits a second data stream.

(1) The first receiver REC0 calculates an estimated bit value for the first data stream $D_0$ according to a signal that is received by the antenna AR0, and the second receiver REC1 calculates an estimated bit value for the first data stream $D_0$ according to a signal that is received by the antenna AR1, then the first receiver REC0 combines these as the estimated bit value $\Delta lnP_0$ of the first data stream. Similarly, the second receiver REC1 obtains the estimated bit value $\Delta lnP_1$ of the second data stream $D_1$.

(2) The first receiver REC0 refines the estimated bit value $\Delta lnP_0$ of the first data stream that was obtained by the aforementioned computation with the estimated bit value $\Delta lnP_1$ of the second data stream, and similarly the second receiver REC1 refines the estimated bit value $\Delta lnP_1$ of the second data stream with the estimated bit value $\Delta lnP_0$ of the first data stream.

(3) The first receiver REC0 and second receiver REC1 repeat the process of steps (1) to (2) a specified number of times.

(4) After a specified number of repetitions, the first receiver REC0 determines the bit $D_0$ of the first data stream based on the aforementioned estimated bit value $\Delta lnP_0$ of the first data stream, and similarly, the second receiver REC1 determines the bit $D_1$ of the second data stream based on the estimated bit value $\Delta lnP_1$ of the second data stream.

FIG. 3 and FIG. 4 show the simulation results for each of the aforementioned receiving methods (ZF-VBL method, MSSE-VBL method, QR-MLD method, MLD method and turbo method), and show the BER (Bit Error Rate) for 2Eb/No. In the simulation, there were two transmission antennas and two receiving antennas, and transmission was performed using QPSK modulation or 16 QAM modulation without encoding. FIG. 3 shows the case in which QPSK modulation was performed, and FIG. 4 shows the case in which 16 QAM modulation was performed, and both show the case in which there was no interference between channels (ICI-Free). The ICI-Free points correspond with AWGN obtained using simulation software.

The simulation results show that the MLD method gave the best BER characteristic. However, there is a very large amount of computations performed in the MLD method, and there is a problem in that the amount of computations due to the increased number of antennas increases exponentially. The proposed turbo receiver shows a BER characteristic that is very close to that of a receiver using the MDL method. However, in 16 QAM modulation, in order to obtain the same BER characteristic as in the MLD method, it is necessary to increase the number of iterations from two times to four times more than in the case of QPSK modulation; therefore computation becomes more complex and increases, and the time necessary for decoding increases. The complexity of the turbo receiver is less than that of a receiver using the MLD method, however, there is a problem in that the complexity increases proportionately with the number of iterations.

[Non-patent Document 1]

A. van Zelst, "Space Division Multiplexing Algorithms", 10th Mediterranean Electrotechnical Conference 2000, MELECON 2000, Cyprus, May 2000, Vol. 3, pp. 1218-1221.

[Non-patent Document 2]

Richard van Nee et al. "Maximum Likelihood Decoding in a Space Division Multiplexing System"; Proc. of IEEE Vehicular Technology Conference (VTC) 2000, Tokyo 2000.

[Patent Document 3]

Japanese patent application no. 2004-378888 (Dec. 28, 2004)

SUMMARY OF THE INVENTION

The object of the present invention is to provide a wireless receiving apparatus (wireless receiver) for a MIMO system that is capable of low bit error rate, and that is capable of decreasing complexity and the amount of computation.

Another object of the present invention is to provide a wireless receiver (single shot (SS) receiver) that employs a parallel maximum a posteriori probabilities estimation algorithm and is capable of reducing the bit error rate without repetitive processing.

The present invention accomplishes the aforementioned object by a wireless receiving apparatus that comprises a plurality of receiving antennas that receive signals that are transmitted from a plurality of transmission antennas and input via a plurality of propagation paths having different propagation characteristics. This wireless receiving apparatus comprises receivers that correspond to each of the plurality of antennas, where each receiver comprises: a computation unit that uses a received signal that was received by the receiving antenna that is connected to it, and received signals that were received by the other receiving antennas, to calculate probability of a signal that was transmitted from a specified transmitter, and a judgment unit that judges the signal that was transmitted from the transmitter based on that probability.

The computation unit calculates the probability using an equation that calculates the probability based on the posteriori probability that the signal transmitted from the transmitter is +1, and the posteriori probability that the signal transmitted from the transmitter is −1.

The computation unit comprises: a plurality of non-linear-processing circuits having a transfer function as an amplitude limiter; and a combining circuit that combines the output from the plurality of non-linear-processing circuits and outputs the probability of the transmitted signal. Also, in addition to the non-linear-processing circuits and combining circuit, the computation circuit comprises a signal-generation unit that generates an input signal input to each of the non-linear-processing circuits based on the product of a specified antenna received signal and specified propagation characteristic.

When a transmission station transmits data using QPSK modulation, each of the receivers comprises: two computation units that execute the aforementioned processing for the real-number portion and imaginary-number portion of the received signal; and two judgment units that execute the aforementioned processing for the real-number portion and imaginary-number portion of the received signal.

With this invention, the receivers that correspond to each of the plurality of receiving antennas use the signal that was received by the receiving antenna that is connected to it, and the signals that were received by the other receiving antennas, to calculate the probability of the signal that was transmitted from a specified transmitter, and judges the signal that was transmitted from that transmitter based on that probability, so it is possible to improve the BER characteristic and reduce the number of computations without performing iterative computation.

Also, the probability-computation unit comprises a plurality of non-linear-processing circuits having a transfer function as an amplitude limiter, and a combining circuit that combines the outputs from the plurality of non-linear-processing circuits so the construction of the receivers is simplified.

Moreover, when a transmission station transmits data using QPSK modulation, each of the receivers comprises a respective computation unit for the real-number portion and imaginary-number portion of the received signal, and a judgment unit that judges the bit based on the probability calculated by the computation units, so even in the case of QPSK modulation, it is possible to improve the BER characteristic and output the determined bit value with a small amount of computations.

Other features and advantages of the present invention will be apparent from the following description taken in conjunction with the accompanying drawings.

DESCRIPTION OF THE PREFERRED EMBODIMENTS (A) Outline of the Invention

Figure 1:
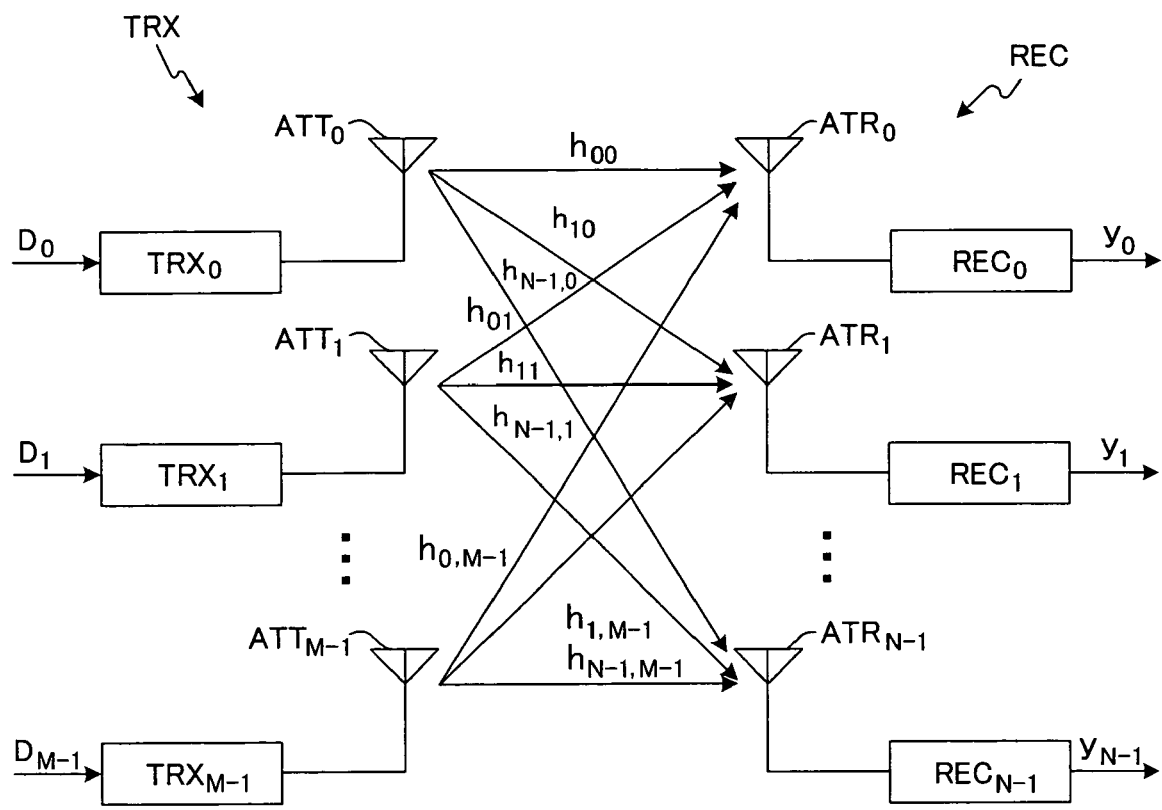
FIG. 1 shows the configuration of a MIMO system.
Figure 2:
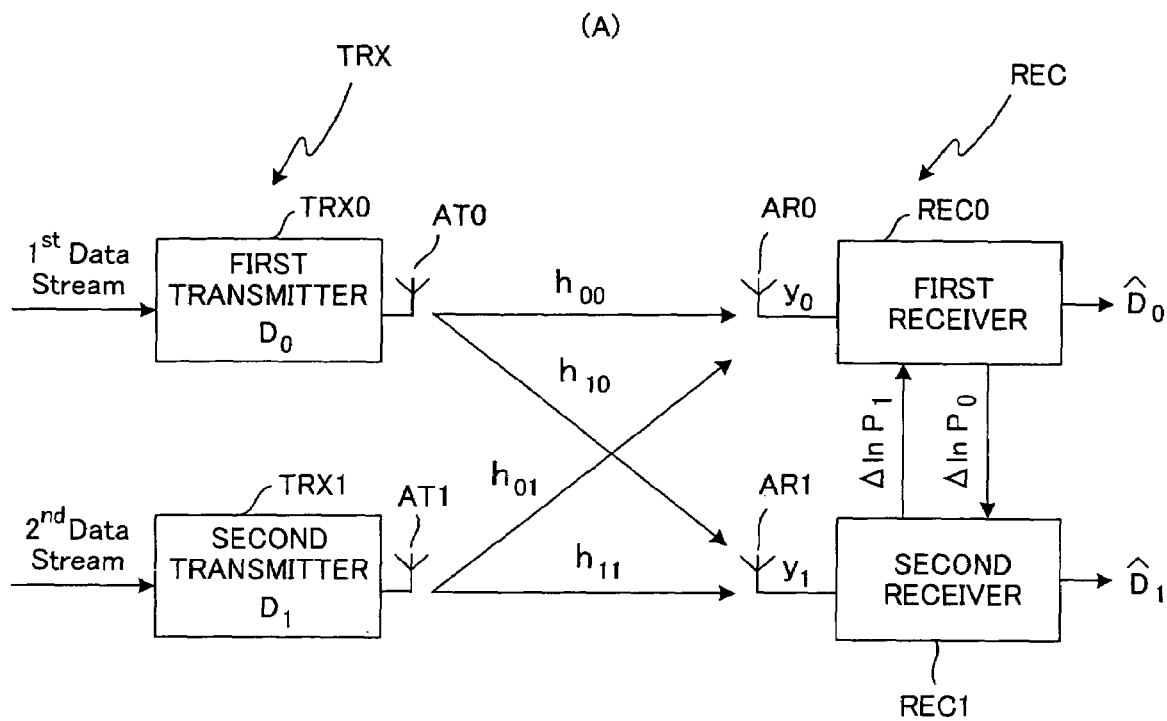
FIG. 2 is a block diagram of a MIMO communication system comprising a proposed turbo receiver.
Figure 2:
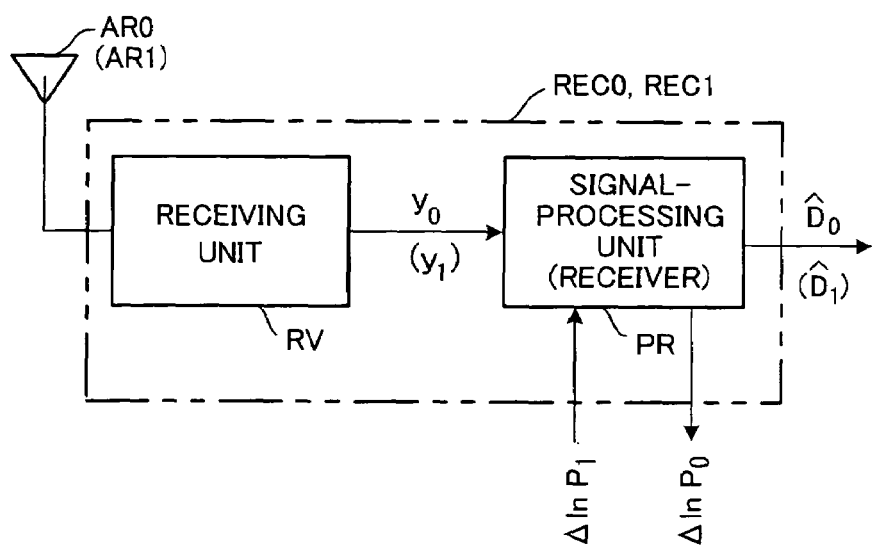
Figure 3:
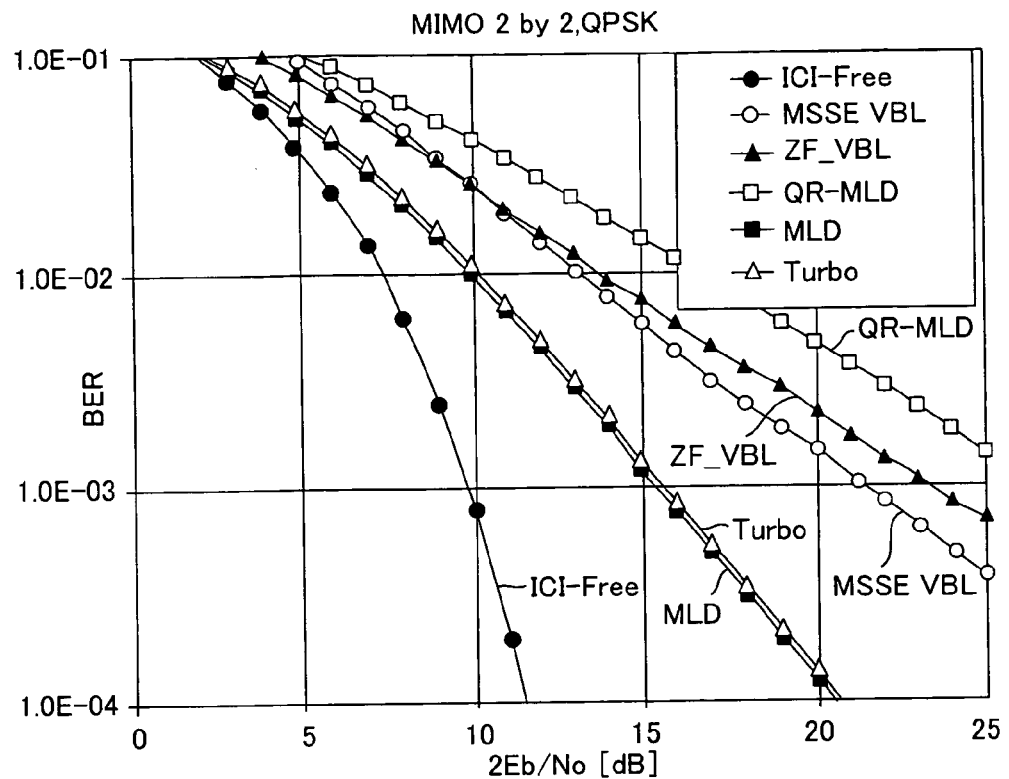
FIG. 3 shows the simulation results for each receiving method (ZF-VBL method, MSSE-VBL method, QR-MLD method, MLD method, turbo method), and is for the case in which QPSK modulation is performed.
Figure 4:
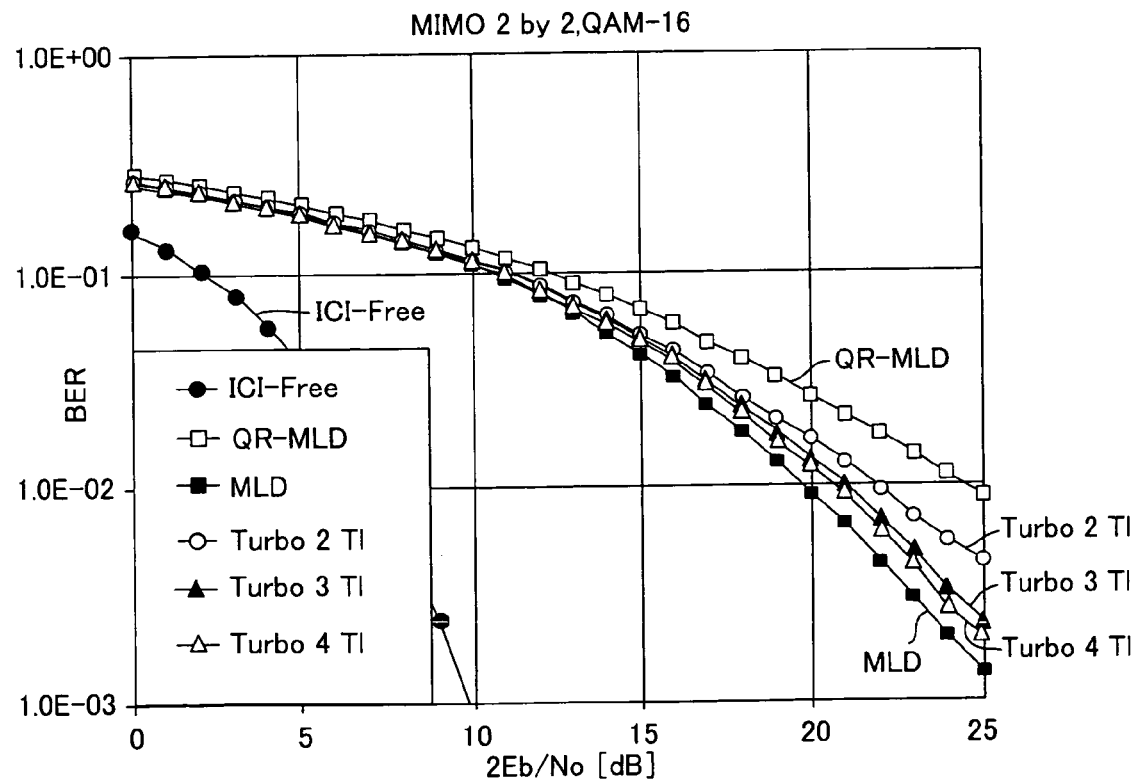
FIG. 4 shows the simulation results for each receiving method (ZF-VBL method, MSSE-VBL method, QR-MLD method, MLD method, turbo method), and is for the case in which 16 QAM modulation is performed.
Figure 5:
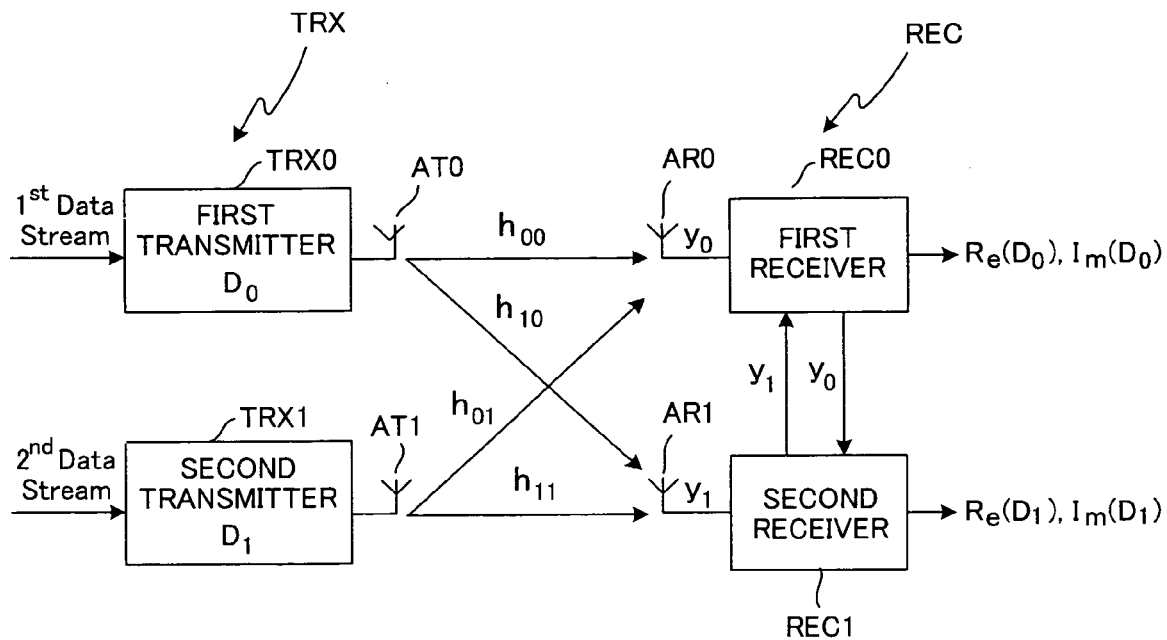
FIG. 5 shows the configuration of the MIMO transmission system of this invention for the case in which both the transmission station and receiving station have two antennas.

FIG. 5 is a block diagram of a MIMO communication system comprising the wireless receiver (wireless receiving apparatus) of this invention, where the transmission station TRX comprises two transmitters TRX0, TRX1, and two transmission antennas AT0, AT1, and the receiving station (wireless receiver) REC comprises two receiving antennas AR0, AR1 and two receivers REC0, REC1. Each of the transmitters TRX0, TRX1 performs QPSK, M-QAM or BPSK modulation and transmits the information symbol Di (i=0, 1). The first transmitter TRX0 transmits a first data stream $D_0$, and the second transmitter TRX1 transmits a second data stream $D_1$. $D_0$ and $D_1$ are both 1 bit when modulated using BPSK modulation, are both 2 bits when modulated using QPSK modulation, and are both 4 bits when modulated using 16-QAM modulation.

The first data stream $D_0$ that is transmitted from the first transmitter TRX0 passes through transmission paths having fading characteristics (channel characteristics) $h_{00}$, $h_{10}$, and arrives at the first and second receiving antennas AR0, AR1. Also, the second data stream $D_1$ that is transmitted from the second transmitter TRX1 passes through transmission paths having channel characteristics $h_{01}$, $h_{11}$, and arrives at the first and second receiving antennas AR0, AR1.

The first receiver REC0 uses the received signal $y_0$ that is received by the antenna AR0 and the received signal $y_1$ that is received by the other receiving antenna AR1, and based on the difference between the posteriori probability that the signal transmitted from the first transmitter TRX0 is +1 and the posteriori probability that the transmitted signal is −1, calculates the probability of the bit signal that is transmitted from the first transmitter TRX0, and then based on that calculated probability, judges the bit signal that is transmitted from the transmitter TRX0. Similarly, the second receiver REC1 uses the received signal $y_1$ that is received by the antenna AR1 and the received signal $y_0$ that is received by the other receiving antenna AR0, and based on the difference between the posteriori probability that the signal transmitted from the second transmitter TRX1 is +1 and the posteriori probability that the transmitted signal is −1, calculates the probability of the bit signal that is transmitted from the second transmitter TRX1, and then based on that calculated probability, determines the bit signal that is transmitted from the transmitter TRX1.

(B) Embodiments

Figure 6:
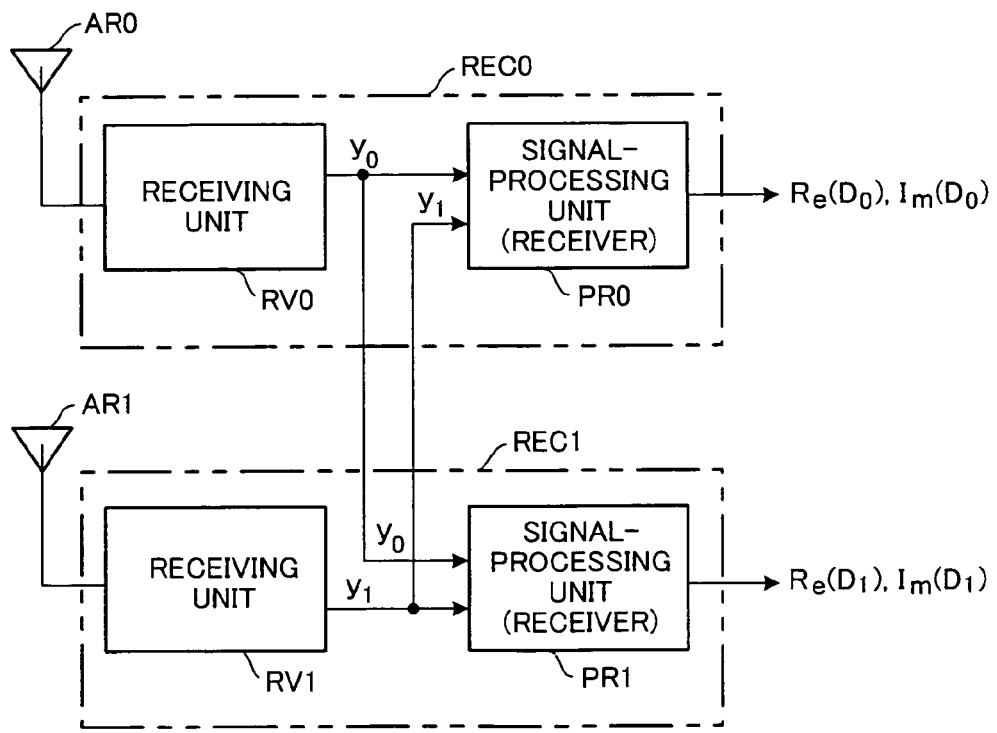
FIG. 6 shows the configuration of the wireless receiver of this invention.

The MIMO transmission system comprising the wireless receiving apparatus of this invention has the block configuration shown in FIG. 5. As shown in FIG. 6, the wireless receiver REC of this MIMO communication system comprises two receiving antennas AR0, AR1 and two receivers REC0, REC1.

The first receiver REC0 comprises a receiving unit RV0 and signal-processing unit PR0, where the receiving unit RV0 performs processing such as data modulation, D/A conversion, quadrature modulation, frequency up-conversion or the like on the signal received by the first receiving antenna AR0, and inputs the obtained signal $y_0$ to the signal-processing unit PR0 and to the signal-processing unit PR1 of the second receiver REC1. The signal-processing unit PR0 uses the received signal $y_0$ that was received by the antenna AR0, and the received signal $y_1$ that was received by the other receiving antenna AR1, and based on the difference between the posteriori probability that the signal transmitted from the first transmitter TRX0 will be +1, and the posteriori probability that the signal will be −1, calculates the probability of the transmitted signal, and based on that probability, judges the signal transmitted by the transmitter TRX0.

When the transmitter transmits using QPSK modulation, the signal-processing unit PR0 calculates the probability for each real-number portion and imaginary-number portion of a plurality of signals transmitted by the first transmitter TRX0, and based on that probability, judges the real-number portion and imaginary-number portion of a plurality of signals transmitted by the transmitter TRX0, and outputs the judgment results Re(D0), Im(D0).

The second receiver REC1 comprises a receiving unit RV1 and signal-processing unit PR1, where the receiving unit RV1 performs processing such as data modulation, D/A conversion, quadrature modulation, frequency up-conversion or the like on the signal received by the second receiving antenna AR1, and inputs the obtained signal $y_1$ to the signal-processing unit PR1 and to the signal-processing unit PR0 of the first receiver REC0. The signal-processing unit PR1 uses the received signal $y_1$ that was received by the antenna AR1, and the received signal $y_0$ that was received by the other receiving antenna AR0, and based on the difference between the posteriori probability that the signal transmitted from the second transmitter TRX1 will be +1, and the posteriori probability that the signal will be −1, calculates the probability of the transmitted signal, and based on that probability, judges the signal transmitted by the transmitter TRX1.

When the transmitter transmits using QPSK modulation, the signal-processing unit PR1 calculates the probability for each real-number portion and imaginary-number portion of a plurality of signals transmitted by the second transmitter TRX1, and based on that probability, judges the real-number portion and imaginary-number portion of a plurality of signals transmitted by the transmitter TRX1, and outputs the judgment results Re(D1), Im(D1).

Each of the transmitters TRX0, TRX1 performs QPSK modulation and transmits the information symbols Di (i=0, 1). The first transmitter TRX0 transmits a first data stream, and the second transmitter TRX1 transmits a second data stream.

The information symbols Di (i=0, 1) of the first and second data streams have a real-number portion Re(Di) and an imaginary-number portion Im(Di). Therefore, Di=($d_{Re}$, $d_{Im}$), where $d_{Re}$=Re(Di), and $d_{Im}$=Im(Di). In the case of QPSK modulation, the information symbol Di is one of the four possible signals $S_j^*(t)$ (j=0, 1, 2, 3). The number j of the signal $S_j^*(t)$ depends on the pair of data bits $d_{Re}$=Re(Di), $d_{Im}$=Im(Di) as shown in Table 1.

TABLE 1

| j | Signal | D | $d_{Re}$ = Re($D_i$) | $d_{Im}$ = Im($D_i$) |
|---|--------|---|----------------------|----------------------|
| 0 | $S_0^*(t)$ | (+1 +1) | (+1) | (+1) |
| 1 | $S_1^*(t)$ | (+1 −1) | (+1) | (−1) |
| 2 | $S_2^*(t)$ | (−1 +1) | (−1) | (+1) |
| 3 | $S_3^*(t)$ | (−1 −1) | (−1) | (−1) |

The thing to notice about signal $S_j^*(t)$ is the relationship $S_0^*(t)=-S_3^*(t)$, and $S_1^*(t)=-S_2^*(t)$. Assuming QPSK transmission, the received signals $y_0(t)$, $y_1(t)$ that are received by the first and second receivers REC0, REC1 can be expressed in a linear combination with the signals transmitted by the transmitters TRX0, TRX1 as in the following equations.

$$y_0(t) = h_{00} \cdot D_0 + h_{01} \cdot D_1 \quad (7)$$

$$y_1(t) = h_{10} \cdot D_0 + h_{11} \cdot D_1 \quad (7)'$$

A new notation $S_{ij}^*(t)$ is adopted for the transmitted signal. The index 'i' in $S_{ij}^*(t)$ indicates the number (0 or 1) of the transmitter, and the index 'j' indicates the information symbol $S_j^*(t)$ (j=0, 1, 2, 3) in Table 1 that is transmitted by the ith transmitter.

By combining the information symbols Di(i=0, 1) transmitted by the first and second transmitters TRX1, TRX2, there are 16 possible signals for the input of each of the receivers REC0, REC1. Table 2 shows all of the possible signals for the input of the first receiver REC0, and Table 3 shows all of the possible signals for the input of the second receiver REC1.

TABLE 2

| REC0 | | |
|------|------|------|
| $S_j(t)$ | $D_0$ | $D_1$ |
| $S_0 = h_{00} \cdot S_{00}^* + h_{01} \cdot S_{10}^*$ | (+1 +1) | (+1 +1) |
| $S_1 = h_{00} \cdot S_{00}^* + h_{01} \cdot S_{11}^*$ | (+1 +1) | (+1 −1) |
| $S_2 = h_{00} \cdot S_{00}^* + h_{01} \cdot S_{12}^*$ | (+1 +1) | (−1 +1) |
| $S_3 = h_{00} \cdot S_{00}^* + h_{01} \cdot S_{13}^*$ | (+1 +1) | (−1 −1) |
| $S_4 = h_{00} \cdot S_{01}^* + h_{01} \cdot S_{10}^*$ | (+1 −1) | (+1 +1) |
| $S_5 = h_{00} \cdot S_{01}^* + h_{01} \cdot S_{11}^*$ | (+1 −1) | (+1 −1) |
| $S_6 = h_{00} \cdot S_{01}^* + h_{01} \cdot S_{12}^*$ | (+1 −1) | (−1 +1) |
| $S_7 = h_{00} \cdot S_{01}^* + h_{01} \cdot S_{13}^*$ | (+1 −1) | (−1 −1) |
| $S_8 = h_{00} \cdot S_{02}^* + h_{01} \cdot S_{10}^*$ | (−1 +1) | (+1 +1) |
| $S_9 = h_{00} \cdot S_{02}^* + h_{01} \cdot S_{11}^*$ | (−1 +1) | (+1 −1) |
| $S_{10} = h_{00} \cdot S_{02}^* + h_{01} \cdot S_{12}^*$ | (−1 +1) | (−1 +1) |
| $S_{11} = h_{00} \cdot S_{02}^* + h_{01} \cdot S_{13}^*$ | (−1 +1) | (−1 −1) |
| $S_{12} = h_{00} \cdot S_{03}^* + h_{01} \cdot S_{10}^*$ | (−1 −1) | (+1 +1) |
| $S_{13} = h_{00} \cdot S_{03}^* + h_{01} \cdot S_{11}^*$ | (−1 −1) | (+1 −1) |
| $S_{14} = h_{00} \cdot S_{03}^* + h_{01} \cdot S_{12}^*$ | (−1 −1) | (−1 +1) |
| $S_{15} = h_{00} \cdot S_{03}^* + h_{01} \cdot S_{13}^*$ | (−1 −1) | (−1 −1) |

TABLE 3

| REC1 | | |
|------|------|------|
| $S_j(t)$ | $D_0$ | $D_1$ |
| $S_{16} = h_{10} \cdot S_{00}^* + h_{11} \cdot S_{10}^*$ | (+1 +1) | (+1 +1) |
| $S_{17} = h_{10} \cdot S_{00}^* + h_{11} \cdot S_{11}^*$ | (+1 +1) | (+1 −1) |
| $S_{18} = h_{10} \cdot S_{00}^* + h_{11} \cdot S_{12}^*$ | (+1 +1) | (−1 +1) |
| $S_{19} = h_{10} \cdot S_{00}^* + h_{11} \cdot S_{13}^*$ | (+1 +1) | (−1 −1) |
| $S_{20} = h_{10} \cdot S_{01}^* + h_{11} \cdot S_{10}^*$ | (+1 −1) | (+1 +1) |
| $S_{21} = h_{10} \cdot S_{01}^* + h_{11} \cdot S_{11}^*$ | (+1 −1) | (+1 −1) |

TABLE 3-continued

| | REC1 | | |
|---|---|---|---|
| $S_j(t)$ | | $D_0$ | $D_1$ |
| $S_{22} = h_{10} \cdot S_{01}{}^* + h_{11} \cdot S_{12}{}^*$ | | (+1 −1) | (−1 +1) |
| $S_{23} = h_{10} \cdot S_{01}{}^* + h_{11} \cdot S_{13}{}^*$ | | (+1 −1) | (−1 −1) |
| $S_{24} = h_{10} \cdot S_{02}{}^* + h_{11} \cdot S_{10}{}^*$ | | (−1 +1) | (+1 +1) |
| $S_{25} = h_{10} \cdot S_{02}{}^* + h_{11} \cdot S_{11}{}^*$ | | (−1 +1) | (+1 −1) |
| $S_{26} = h_{10} \cdot S_{02}{}^* + h_{11} \cdot S_{12}{}^*$ | | (−1 +1) | (−1 +1) |
| $S_{27} = h_{10} \cdot S_{02}{}^* + h_{11} \cdot S_{13}{}^*$ | | (−1 +1) | (−1 −1) |
| $S_{28} = h_{10} \cdot S_{03}{}^* + h_{11} \cdot S_{10}{}^*$ | | (−1 −1) | (+1 +1) |
| $S_{29} = h_{10} \cdot S_{03}{}^* + h_{11} \cdot S_{11}{}^*$ | | (−1 −1) | (+1 −1) |
| $S_{30} = h_{10} \cdot S_{03}{}^* + h_{11} \cdot S_{12}{}^*$ | | (−1 −1) | (−1 +1) |
| $S_{31} = h_{10} \cdot S_{03}{}^* + h_{11} \cdot S_{11}{}^*$ | | (−1 −1) | (−1 −1) |

(a) Determining the Real-Number Portion $d_{Re} \equiv \text{Re}(D_0)$ of the Symbol $D_0$ Received by the First Receiver REC0

From Table 2, the posteriori probability that the first receiver REC0 will receive Sj (j=0, 1, . . . , 15) is given by the following equation according to the Bayes' mixed rule.

$$P_1[d_{Re}/y_0(t)] = P_1[S_j/y_0(t)] \quad (8)$$

$$= \frac{P_a(S_j) \cdot P(y_0(t)/S_j)}{P(y_0(t))}$$

$$\equiv k_0 \cdot P_a(S_j) \cdot \exp\left\{-\frac{1}{N_0} \int_0^T [y_0(t) - S_j]^2 dt\right\}$$

Where,
- $k_0$ is the normalization factor;
- j=0, 1, . . . , 15;
- $y_0(t)$ is a combined signal obtained by combining a signal $S_j$ and a white Gauss noise n(t) that contains the spectral power strength $N_0(y_0(t)=S_j+n(t))$;
- $P_i(S_j/y_0(t))$ is the posteriori probability that the signal $S_j(t)$ will be received by the ith receiver (probability that the received signal $y_0(t)$ is $S_j(t)$);
- $P_i(d_{Re}/y_0(t))$ is the posteriori probability that $d_{Re}$ will be received by the ith receiver (probability that the received signal $y_0(t)$ is $d_{Re}$);
- $P_a(S_j)$ is the priori probability that the transmission signal is $S_j(t)$;
- $P(y_0(t)/S_j)$ is a conditional probability, and is the probability that a transmitted code word was $S_j$ when the received word was $y_0(t)$;
- $P(y_0(t))$ is the probability that $y_0(t)$ will be received.

Similarly, from Table 3 the posteriori probability that the second receiver REC1 will receive Sj (j=16, 17, . . . , 31) is given by the following equation.

$$P_2[d_{Re}/y_1(t)] = P_2[S_j/y_1(t)] \quad (9)$$

$$= \frac{P_a(S_j) \cdot P(y_1(t)/S_j)}{P(y_1(t))}$$

$$\equiv k_0 P_a(S_j) \cdot \exp\left\{-\frac{1}{N_0} \int_0^T [y_1(t) - S_j]^2 dt\right\}$$

The probability that the received bit $d_{Re}$=+1 can be expressed as the logical AND operation (AND) of the posteriori probabilities P(Sj) that the signal Sj will be received by the first and second receiver REC0, REC1, and can be written as below.

$$P(d_{Re} = +1) = \quad (10)$$
$$P_a(S_0)P(S_0)P_a(S_{16})P(S_{16}) + P_a(S_1)P(S_1)P_a(S_{17})P(S_{17}) +$$
$$P_a(S_2)P(S_2)P_a(S_{18})P(S_{18}) + P_a(S_3)P(S_3)P_a(S_{19})P(S_{19}) +$$
$$P_a(S_4)P(S_4)P_a(S_{20})P(S_{20}) + P_a(S_5)P(S_5)P_a(S_{21})P(S_{21}) +$$
$$P_a(S_6)P(S_6)P_a(S_{22})P(S_{22}) + P_a(S_7)P(S_7)P_a(S_{23})P(S_{23})$$

Similarly, the probability that the received bit $d_{Re}$=−1 can be written as below.

$$P(d_{Re} = -1) = \quad (11)$$
$$P_a(S_8)P(S_8)P_a(S_{24})P(S_{24}) + P_a(S_9)P(S_9)P_a(S_{25})P(S_{25}) +$$
$$P_a(S_{10})P(S_{10})P_a(S_{26})P(S_{26}) + P_a(S_{11})P(S_{11})P_a(S_{27})P(S_{27}) +$$
$$P_a(S_{12})P(S_{12})P_a(S_{28})P(S_{28}) + P_a(S_{13})P(S_{13})P_a(S_{29})P(S_{29}) +$$
$$P_a(S_{14})P(S_{14})P_a(S_{30})P(S_{30}) + P_a(S_{15})P(S_{15})P_a(S_{31})P(S_{31})$$

In equations (10) and (11), $P_a(S_j)$ is the priori probability that the transmitted/received signal is $S_j(t)$, and $P(S_j)$ is the probability of receiving the signal $S_j(t)$ during mixed input of $y_0(t)$ and $y_1(t)$. Here, supposing that the bit in the stream is statically independent, and the probabilities are equal (P(+1)=P(−1)=½), then the priori probability $P_a(S_j)$ that the transmitted/received signal is Sj(t) is 0.25 (=0.5×0.5).

According to equations (10) and (11), judging a group of information symbols $D_0$, $D_1$ for both receivers REC0, REC1 is performed in parallel at the same time. Based on Table 2 and Table 3 the signals are joined by the logical AND operation of equations (10) and (11). For example, supposing that a group of information symbols $D_0$, $D_1$ equivalent to (+1+1) are transferred, the signal corresponding to the receiver input becomes the AND of $S_0$ of the first receiver REC0 and $S_{16}$ of the second receiver REC1. In Equation (10) and (11), this logical AND operation is expressed as the product of probabilities, $P(S_0)$ AND $P(S_{16})$, or $P(S_0) \cdot P(S_{16})$. From Table 2 and Table 3, similar results can be obtained for all possible bit $D_0$, $D_1$ combinations and signals.

Supposing that the priori probability $Pa(S_j)$ that the transmitted/received signal is $S_j(t)$ is equal for all signals, then equations (10) and (11) can be rewritten as below.

$$P(d_{Re} = +1) = \quad (12)$$
$$\{P(S_0)P(S_{16}) + P(S_1)P(S_{17}) + P(S_2)P(S_{18}) + P(S_3)P(S_{19})\} +$$
$$\{P(S_4)P(S_{20}) + P(S_5)P(S_{21}) + P(S_6)P(S_{22}) + P(S_7)P(S_{23})\}$$

$$P(d_{Re} = -1) = \quad (13)$$
$$\{P(S_8)P(S_{24}) + P(S_9)P(S_{25}) + P(S_{10})P(S_{26}) + P(S_{11})P(S_{27})\} +$$
$$\{P(S_{12})P(S_{28}) + P(S_{13})P(S_{29}) + P(S_{14})P(S_{30}) + P(S_{15})P(S_{31})\}$$

The code of the real-number portion $d_{Re}$ of the received information symbol received by the maximum-likelihood receiver can be determined based on the comparison result of the posteriori probabilities or the logarithms of the posteriori probabilities. In other words, it is possible to determine the code (0 or 1) by comparing which is larger, the probability that the real-number portion $d_{Re}$ of the received information symbol is 1 or the probability that it is 0, or by comparing the difference of the logarithms of these with the threshold.

Moreover, the code of the real portion $d_{Re}$ of the received information symbol is found from the following equation.

$$\frac{P(d_{Re} = +1/(y_0(t), y_1(t)))}{P(d_{Re} = -1/(y_0(t), y_1(t)))} \gtreqqless 1 \quad (14)$$

or $$\ln P(d_{Re} = +1/(y_0(t), y_1(t))) - \ln P(d_{Re} = -1/(y_0(t), y_1(t))) \gtreqqless 0 \quad (15)$$

Here, ln indicates the logarithm operation. Also, $y_0(t)$ and $y_1(t)$ are combined signals obtained by combining a signal line $S_j$ and the white Gauss noises $n_0(t)$, $n_1(t)$ having spectral power strength $N_0$ ($y_0(t)=S_j+n_0(t)$, $y_1(t)=S_j+n_1(t)$). Equation (15) is the decision rule for determine the code for the real-number portion $d_{Re}$ of the received information symbol.

Here, by considering the algebraic identity of the following equation $$\ln(e^X + e^Y) = \frac{X+Y}{2} + \ln 2 + \ln \cosh\left(\frac{X-Y}{2}\right) \quad (16)$$

the ln function of equations (12) and (13) are given by the following equations.

$$\ln\{P(d_{Re} = +1)\} = 0.5(\ln(P(S_0)P(S_{16}) + P(S_1)P(S_{17}) + P(S_2)P(S_{18}) + P(S_3)P(S_{19}))) + \quad (17)$$
$$0.5(\ln(P(S_4)P(S_{20}) + P(S_5)P(S_{21}) + P(S_6)P(S_{22}) + P(S_7)P(S_{23}))) +$$
$$\ln\left\{\cosh\left[\begin{array}{l}0.5(\ln(P(S_0)P(S_{16}) + P(S_1)P(S_{17}) + P(S_2)P(S_{18}) + P(S_3)P(S_{19}))) - \\ 0.5(\ln(P(S_4)P(S_{20}) + P(S_5)P(S_{21}) + P(S_6)P(S_{22}) + P(S_7)P(S_{23})))\end{array}\right]\right\}$$

$$\ln\{P(d_{Re} = -1)\} = 0.5(\ln(P(S_8)P(S_{24}) + P(S_9)P(S_{25}) + P(S_{10})P(S_{26}) + P(S_{11})P(S_{27}))) + \quad (18)$$
$$0.5(\ln(P(S_{12})P(S_{28}) + P(S_{13})P(S_{29}) + P(S_{14})P(S_{30}) + P(S_{31})P(S_{15}))) +$$
$$\ln\left\{\cosh\left[\begin{array}{l}0.5(\ln(P(S_8)P(S_{24}) + P(S_9)P(S_{25}) + P(S_{10})P(S_{26}) + P(S_{11})P(S_{27}))) - \\ 0.5(\ln(P(S_{12})P(S_{28}) + P(S_{13})P(S_{29}) + P(S_{14})P(S_{30}) + P(S_{15})P(S_{31})))\end{array}\right]\right\}$$

However, the following equation is established.

$$\ln\{\exp(A)+\exp(B)+\exp(C)+\exp(D)\}=Lin+NLin \quad (19)$$

Where, in the equation above $$Lin=0.25[(A+B)+(C+D)]+\ln(2)+0.5[\ln\{\cos h/0.5(A-B)\}]+\ln\{\cos h/0.5(C-D)\}]+\ln(2) \quad (20a)$$

$$Arg=0.25[(A+B)-(C+D)]+0.5[\ln\{\cos h/0.5(A-B)\}]-\ln\{\cos h/0.5(C-D)\}] \quad (20b)$$

$$NLin=\ln\{\cos h/0.5\ Arg]\} \quad (20c)$$

Also, assuming that $$P(S_0)P(S_{16})=A,\ P(S_1)P(S_{17})=B,$$
$$P(S_2)P(S_{18})=C,\ P(S_3)P(S_{19})=D \quad (21)$$

then the first term on the right side of equation (17) is given by the equation below.

$$(\ln(P(S_0)P(S_{16}) + P(S_1)P(S_{17}) + P(S_2)P(S_{18}) + P(S_3)P(S_{19}))) = \quad (22)$$
$$0.25(\ln P(S_0) + \ln P(S_{16}) + \ln P(S_1) + \ln P(S_{17}) +$$
$$\ln P(S_2) + \ln P(S_{18}) + \ln P(S_3) + \ln P(S_{19})) + \ln 2 +$$
$$0.5(\ln\{\cosh[0.5(\ln P(S_0) + \ln P(S_{16}) - \ln P(S_1) - \ln P(S_{17}))]\}) +$$
$$0.5(\ln\{\cosh[0.5(\ln P(S_2) + \ln P(S_{18}) - \ln P(S_3) - \ln P(S_{19}))]\}) + \ln 2 +$$
$$\ln\left\{\cosh\left[0.5\left(\begin{array}{l}0.25\left(\begin{array}{l}\ln P(S_0) + \ln P(S_{16}) + \ln P(S_1) + \ln P(S_{17}) - \\ \ln P(S_2) - \ln P(S_{18}) - \ln P(S_3) - \ln P(S_{19})\end{array}\right) + \\ 0.5(\ln\{\cosh[0.5(\ln P(S_0) + \ln P(S_{16}) - \ln P(S_1) - \ln P(S_{17}))]\}) - \\ 0.5(\ln\{\cosh[0.5(\ln P(S_2) + \ln P(S_{18}) - \ln P(S_3) - \ln P(S_{19}))]\})\end{array}\right)\right]\right\}$$

Also assuming that $$P(S_4)P(S_{20})=A,\ P(S_5)P(S_{21})=B,$$
$$P(S_6)P(S_{22})=C,\ P(S_7)P(S_{23})=D \qquad (23)$$

then the second term on the right side of equation (17) is given by the equation below.

$$(\ln(P(S_4)P(S_{20}) + P(S_5)P(S_{21}) + P(S_6)P(S_{22}) + P(S_7)P(S_{23}))) = \qquad (24)$$

$$0.25(\ln P(S_4) + \ln P(S_{20}) + \ln P(S_5) + \ln P(S_{21}) +$$

$$\ln P(S_6) + \ln P(S_{22}) + \ln P(S_7) + \ln P(S_{23})) + \ln 2 +$$

$$0.5(\ln\{\cosh[0.5(\ln P(S_4) + \ln P(S_{20}) - \ln P(S_5) - \ln P(S_{21}))]\}) +$$

$$0.5(\ln\{\cosh[0.5(\ln P(S_6) + \ln P(S_{22}) - \ln P(S_7) - \ln P(S_{23}))]\}) + \ln 2 +$$

$$\ln\left\{\cosh\left[0.5\left(\begin{array}{l} 0.25\left(\begin{array}{l}\ln P(S_4) + \ln P(S_{20}) + \ln P(S_5) + \ln P(S_{21}) - \\ \ln P(S_6) - \ln P(S_{22}) - \ln P(S_7) - \ln P(S_{23})\end{array}\right) + \\ 0.5(\ln\{\cosh[0.5(\ln P(S_4) + \ln P(S_{20}) - \ln P(S_5) - \ln P(S_{21}))]\}) - \\ 0.5(\ln\{\cosh[0.5(\ln P(S_6) + \ln P(S_{22}) - \ln P(S_7) - \ln P(S_{23}))]\}) \end{array}\right)\right]\right\}$$

Also, assuming that $$P(S_8)P(S_{24})=A,\ P(S_9)P(S_{25})=B,$$
$$P(S_{10})P(S_{26})=C,\ P(S_{11})P(S_{27})=D \qquad (25)$$

then the first term on the right side of equation (18) is given by the equation below.

$$(\ln(P(S_8)P(S_{24}) + P(S_9)P(S_{25}) + P(S_{10})P(S_{26}) + P(S_{11})P(S_{27}))) = \qquad (26)$$

$$0.25(\ln P(S_8) + \ln P(S_{24}) + \ln P(S_9) + \ln P(S_{25}) +$$

$$\ln P(S_{10}) + \ln P(S_{26}) + \ln P(S_{11}) + \ln P(S_{27})) + \ln 2 +$$

$$0.5(\ln\{\cosh[0.5(\ln P(S_8) + \ln P(S_{24}) - \ln P(S_9) - \ln P(S_{25}))]\}) +$$

$$0.5(\ln\{\cosh[0.5(\ln P(S_{10}) + \ln P(S_{26}) - \ln P(S_{11}) - \ln P(S_{27}))]\}) + \ln 2 +$$

$$\ln\left\{\cosh\left[0.5\left(\begin{array}{l} 0.25\left(\begin{array}{l}\ln P(S_8) + \ln P(S_{24}) + \ln P(S_9) + \ln P(S_{25}) - \\ \ln P(S_{10}) - \ln P(S_{26}) - \ln P(S_{11}) - \ln P(S_{26})\end{array}\right) + \\ 0.5(\ln\{\cosh[0.5(\ln P(S_8) + \ln P(S_{24}) - \ln P(S_9) - \ln P(S_{25}))]\}) - \\ 0.5(\ln\{\cosh[0.5(\ln P(S_{10}) + \ln P(S_{26}) - \ln P(S_{11}) - \ln P(S_{27}))]\}) \end{array}\right)\right]\right\}$$

Moreover, assuming that $$P(S_{12})P(S_{28})=A, \ P(S_{13})P(S_{29})=B,$$

$$P(S_{14})P(S_{30})=C, \ P(S_{15})P(S_{31})=D \quad (27)$$

then the second term on the right side of equation (18) is given by the equation below.

$$(\ln(P(S_{12})P(S_{28}) + P(S_{13})P(S_{29}) + P(S_{14})P(S_{30}) + P(S_{15})P(S_{31}))) = \quad (28)$$
$$0.25(\ln P(S_{12}) + \ln P(S_{28}) + \ln P(S_{13}) + \ln P(S_{29}) +$$
$$\ln P(S_{14}) + \ln P(S_{30}) + \ln P(S_{15}) + \ln P(S_{31})) + \ln 2 +$$
$$0.5(\ln\{\cosh[0.5(\ln P(S_{12}) + \ln P(S_{28}) - \ln P(S_{13}) - \ln P(S_{29}))]\}) +$$
$$0.5(\ln\{\cosh[0.5(\ln P(S_{14}) + \ln P(S_{30}) - \ln P(S_{15}) - \ln P(S_{31}))]\}) + \ln 2 +$$
$$\ln\left\{\cosh\left[0.5\left[\begin{array}{l}0.25\left(\begin{array}{l}\ln P(S_{12}) + \ln P(S_{28}) + \ln P(S_{13}) + \ln P(S_{29}) - \\ \ln P(S_{14}) - \ln P(S_{30}) - \ln P(S_{15}) - \ln P(S_{31})\end{array}\right) + \\ 0.5(\ln\{\cosh[0.5(\ln P(S_{12}) + \ln P(S_{28}) - \ln P(S_{13}) - \ln P(S_{29}))]\}) - \\ 0.5(\ln\{\cosh[0.5(\ln P(S_{14}) + \ln P(S_{30}) - \ln P(S_{15}) - \ln P(S_{31}))]\})\end{array}\right]\right]\right\}$$

Considering that the following equations $$\ln P(S_0) - \ln P(S_1) = 4Im\{y_0(t)h^*_{01}\} - 4 Im\{h_{00}S^*_{00}h^*_{01}\} \quad (29a)$$

$$\ln P(S_{16}) - \ln P(S_{17}) = 4Im\{y_1(t)h^*_{11}\} - 4 Im\{h_{10}S^*_{00}h^*_{11}\} \quad (29b)$$

$$\ln P(S_2) - \ln P(S_3) = 4Im\{y_0(t)h^*_{01}\} - 4 Im\{h_{00}S^*_{00}h^*_{01}\} \quad (29c)$$

$$\ln P(S_{18}) - \ln P(S_{19}) = 4Im\{y_1(t)h^*_{11}\} - 4 Im\{h_{10}S^*_{00}h^*_{11}\} \quad (29d)$$

$$\ln P(S_0) + \ln P(S_{16}) + \ln P(S_1) + \ln P(S_{17}) - \ln P(S_2) -$$
$$\ln P(S_{18}) - \ln P(S_3) - \ln P(S_{19}) = 2(4Re\{y_0(t)h^*_{01} + y_1(t)h^*_{11}\} - 4Re\{h_{00}h^*_{01} + h_{10}h^*_{11}\}) \quad (29e)$$

are established in equation (22), and that the same relationships are established in equations (24), (26) and (28), then finally the decision rule of equation (15) is given by the following equation. Or in other words the decision rule becomes as below.

$$\ln P(d_{Re} = +1/(y_0(t), y_1(t))) - \ln P(d_{Re} = -1/(y_0(t), y_1(t))) =$$
$$\ln P_0(I) = 4Re(y_0(t)h^*_{00} + y_1(t)h^*_{10}) + 0.5(L_1 - L_2 +$$
$$L_3 + L_4) + \ln ch\{0.5(f_1 + f_2)\} - \ln ch\{0.5(f_3 + f_4)\} \quad (30)$$

The method for finding equation (30) will be explained in appendix.

In equation (30)

$$L_1 = \begin{pmatrix} \ln ch\{0.5(4\text{Im}(y_0(t)h^*_{01} + y_1(t)h^*_{11}) - (4\text{Re}(h_{00}h^*_{01} + h_{10}h^*_{11}) + 4\text{Im}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{11}h^*_{11}) + 4\text{Im}(h_{00}h^*_{01} + h_{10}h^*_{11})))\} \end{pmatrix} \quad (31a)$$

$$L_2 = \begin{pmatrix} \ln ch\{0.5(4\text{Im}(y_0(t)h^*_{01} + y_1(t)h^*_{11}) - (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (31b)$$

$$L_3 = \begin{pmatrix} \ln ch\{0.5(4\text{Re}(y_0(t)h^*_{01} + y_1(t)h^*_{11}) - (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Re}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (31c)$$

$$L_4 = \begin{pmatrix} \ln ch\{0.5(4\text{Re}(y_0(t)h^*_{01} + y_1(t)h^*_{11}) - (4\text{Re}(h_{00}h^*_{01} + h_{10}h^*_{11}) + 4\text{Im}(h_{00}h^*_{01} + h_{10}h^*_{11})))\} - \\ \ln ch\{0.5(4\text{Re}(y_0(t)h^*_{01} + y_1(t)h^*_{11}) + (4\text{Re}(h_{00}h^*_{01} + h_{10}h^*_{11}) + 4\text{Im}(h_{00}h^*_{01} + h_{10}h^*_{11})))\} \end{pmatrix} \quad (31d)$$

$$f_1 = \begin{pmatrix} \ln ch\{0.5(4\text{Im}(y_0(t)h^*_{01} + y_1(t)h^*_{11}) - (4\text{Im}(h_{00}h^*_{01} + h_{10}h^*_{11}) + 4\text{Re}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (30e)$$

$$f_2 = \begin{pmatrix} \ln ch\{0.5(4\text{Re}(y_0(t)h^*_{01} + y_1(t)h^*_{11}) + (4\text{Im}(h_{00}h^*_{01} + h_{10}h^*_{11}) - 4\text{Re}(h_{00}h^*_{01} + h_{10}h^*_{11})))\} - \\ \ln ch\{0.5(4\text{Re}(y_0(t)h^*_{01} + y_1(t)h^*_{11}) - (4\text{Im}(h_{00}h^*_{01} + h_{10}h^*_{11}) + 4\text{Re}(h_{00}h^*_{01} + h_{10}h^*_{11})))\} \end{pmatrix} \quad (31f)$$

$$f_3 = \begin{pmatrix} \ln ch\{0.5(4\text{Im}(y_0(t)h^*_{01} + y_1(t)h^*_{11}) - (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{10}h^*_{11}) + 4\text{Im}(h_{00}h^*_{01} + h_{10}h^*_{11})))\} \end{pmatrix} \quad (31g)$$

$$f_4 = \begin{pmatrix} \ln ch\{0.5(4\text{Re}(y_0(t)h^*_{01} + y_1(t)h^*_{11}) + (4\text{Re}(h_{00}h^*_{01} + h_{10}h^*_{11}) + 4\text{Im}(h_{00}h^*_{01} + h_{10}h^*_{11})))\} - \\ \ln ch\{0.5(4\text{Re}(y_0(t)h^*_{01} + y_1(t)h^*_{11}) - (4\text{Im}(h_{00}h^*_{01} + h_{10}h^*_{11}) - 4\text{Re}(h_{00}h^*_{01} + h_{10}h^*_{11})))\} \end{pmatrix} \quad (31h)$$

In the above equations, ln in the term ln ch is the logarithm, and ch is cosh (hyperbolic cosine).

Figure 7:
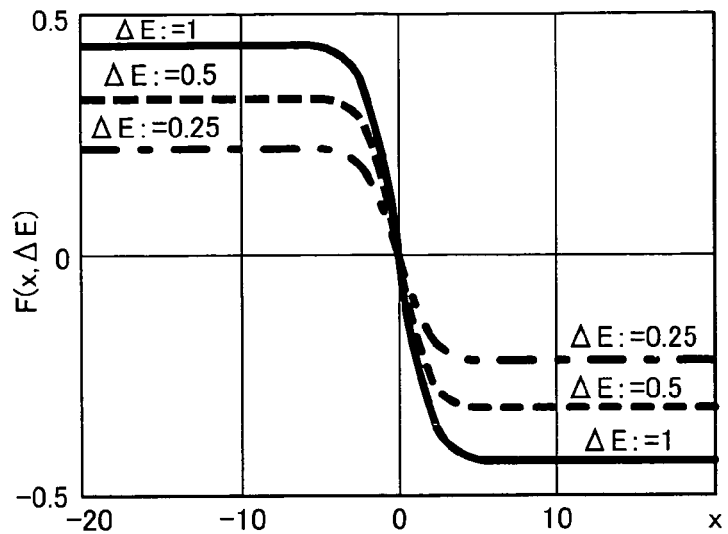
FIG. 7 shows the transmission characteristics of a limiter, which is a non-linear element.

The non-linear function having the pattern of the following equation $$F(x, \Delta E) = \ln\cosh\left\{\frac{x - \Delta E}{2}\right\} - \ln\cosh\left\{\frac{x + \Delta E}{2}\right\} \quad (32)$$

that exists in equations (31a) to (31h) can be described as a limiter having a linear domain. The limiter level of this non-linear function depends on the S/N ratio (signal to noise spectral power strength ratio) and energy difference $\Delta E$. FIG. 7 shows the transmission characteristics of the non-linear function $F(x, \Delta E)$ when the energy difference $\Delta E$ is used as a parameter.

Here, new notation will be employed. In other words, the first notation is as below.

$$S_0 = Re\{k(y_0 \cdot h^*_{00} + y_1 h^*_{10})\}, S_1 = Im\{k(y_0 \cdot h^*_{01} + y_1 h^*_{11})\}$$

$$S_2 = Re\{k(y_0 \cdot h^*_{01} + y_1 h^*_{11})\}, S_3 = Im\{k(y_0 \cdot h^*_{00} + y_1 h^*_{10})\} \quad (33)$$

Figure 8:
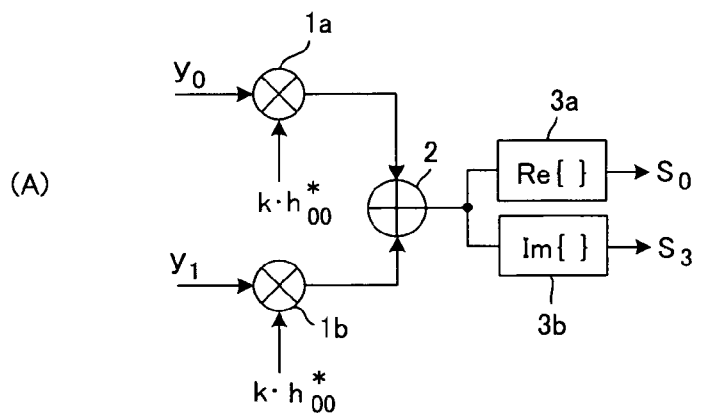
FIG. 8 shows the configuration of the generation unit for input signals S0 to S4 that are input to the non-linear element.
Figure 8:
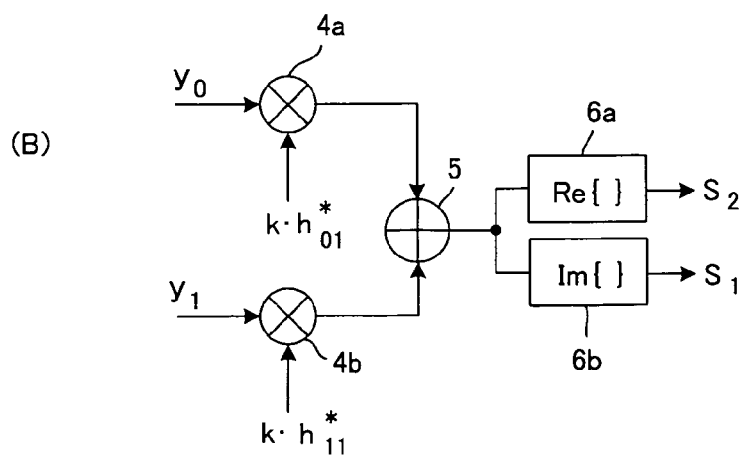

As shown in (A) of FIG. 8, the signals $S_0$, $S_3$ in this notation can be calculated using a multiplier $1a$ that multiplies the received signal $y_0$ by $k \cdot h_{00}$, a multiplier $1b$ that multiplies the received signal $y_1$ by $k \cdot h_{10}^*$, an adder 2 that adds the products from each of the multipliers, a real-number-extraction unit $3a$ that extracts the real-number portion from the added result, and an imaginary-number-extraction unit $3b$ that extracts the imaginary portion. Also, as shown in (B) of FIG. 8, the signals $S_1$, $S_2$ can be calculated using a multiplier $4a$ that multiplies the received signal $y_0$ by $k \cdot h_{01}^*$, a multiplier $4b$ that multiplies the received signal $y_1$ by $k \cdot h_{11}^*$, an adder 5 that adds the products from each of the multipliers, a real-number-extraction unit $6a$ that extracts the real-number portion from the added result, and an imaginary-number-extraction unit $6b$ that extracts the imaginary portion.

The second notation is as below.

$$Im\ \Delta E = Im(h_{00} \cdot h^*_{01} + h_{10} h^*_{11}),\ Re\ \Delta E = Re(h_{00} \cdot h^*_{01} + h_{10} h^*_{11}),$$

$$\Delta E_0 = Re\ \Delta E + Im\ \Delta E,\ \Delta E_1 = Re\ \Delta E - Im\ \Delta E \quad (34)$$

Figure 9:
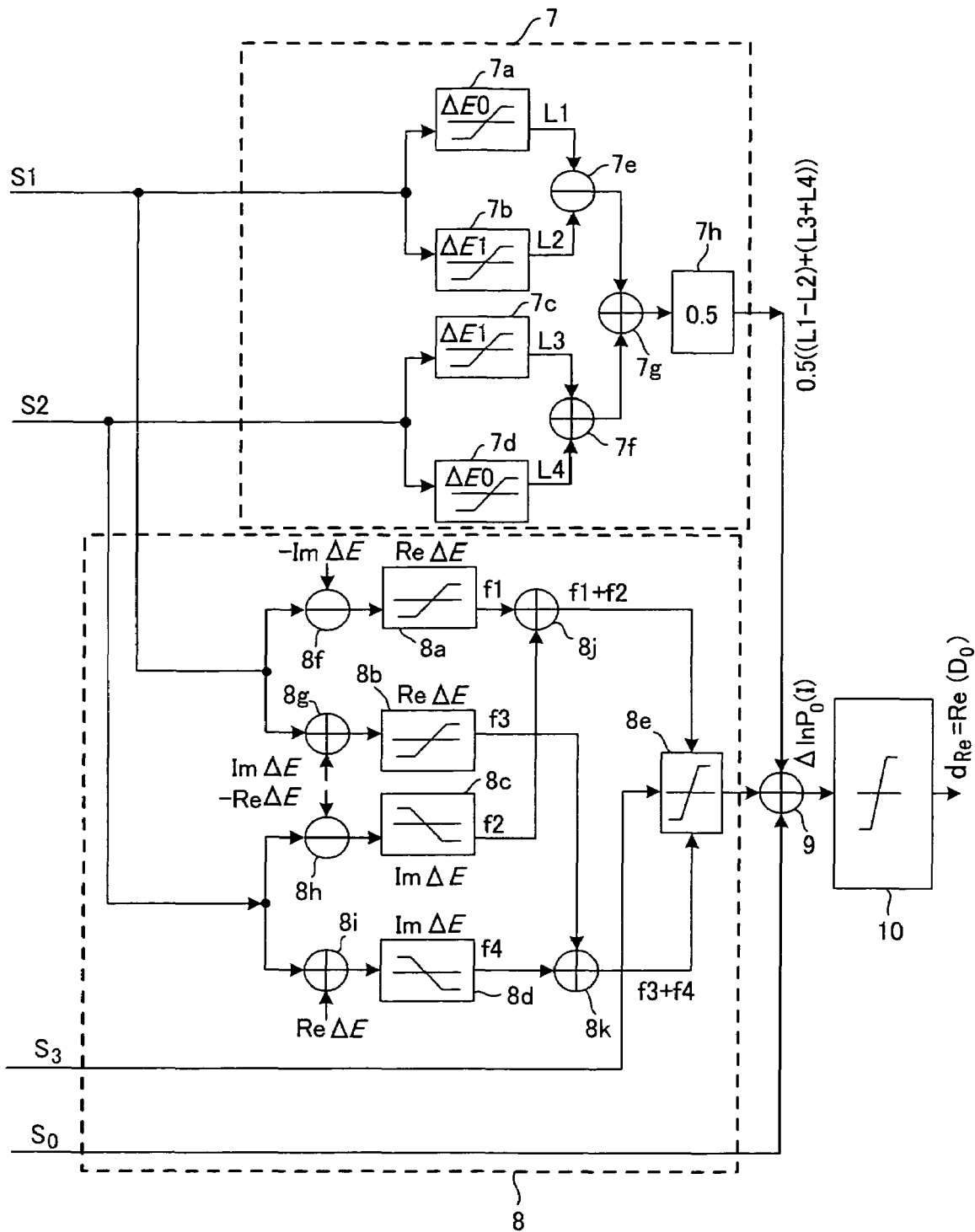
FIG. 9 shows the configuration of the signal-processing unit that determines whether or not the real number portion of the first symbol $D_0$ is +1 or −1.

FIG. 9 shows the configuration of the signal-processing unit PR0 that calculates $\ln P_0(1)$ based on equation (30), then uses this $\ln P_0(1)$ to determine whether or not the real-number portion of the first symbol $D_0$ is +1 or −1, and outputs the judgment result $d_{Re}=Re(D_0)$. However, the normalization factor k is taken to be $4/N_0$ ($N_0$ is the spectrum strength of the Gauss noise).

The signal-processing unit PR0 shown in FIG. 9 is created taking into consideration the notation of (33) and (34) above, and the non-linear function of equation (32), where $7a$ to $7d$, and $8a$ to $8e$ in blocks 7 and 8 are limiters having the specified energy difference shown in FIG. 7.

Block 7 calculates the second term on the right of equation (30) $(L_1 - L_2 + L_3 + L_4)$, and block 8 calculates the third and fourth terms on the right of equation (30), and the adder 9 calculates and outputs the following.

$$\ln P_0(I) = \ln P(d_{Re} = +1/(y_0(t), y_1(t))) - \ln P(d_{Re} = -1/(y_0(t), y_1(t))) \quad (35)$$

In block 7, $7e$ is a subtractor, $7f$ to $7g$ are adders, and $7h$ is a multiplier, in block 8, $8f$ to $8k$ are adders/subtractors. The judgment unit 10 determines whether or not the real-number portion of the first symbol $D_0$ is +1 or −1 based on the probability $\ln P_0(1)$, and outputs the judgment result $d_{Re}=Re(D_0)$.

(b) Determining the Real-Number Portion $d_{Re}=Re(D_1)$ of the Second Symbol $D_1$ Determining the real-number portion $d_{Re}=Re(D_1)$ of the second symbol $D_1$ can be performed in the same way as determining the real-number portion of the first symbol $D_0$. The following equations can be used as $S_0$ to $S_3$ in FIG. 9.

$$S_0 = Re\{k(y_0 \cdot h^*_{01} + y_1 h^*_{11})\}, S_1 = Im\{K(y_0 \cdot h^*_{00} + y_1 h^*_{10})\}$$

$$S_2 = Re\{k(y_0 \cdot h^*_{00} + y_1 h^*_{10})\}, S_3 = Im\{k(y_0 \cdot h^*_{01} + y_1 h^*_{11})\} \quad (36)$$

Also, the following equations can be used as $Im\Delta E$, $Re\Delta E$, $\Delta E_0$ and $\Delta E_1$.

$$Im\ \Delta E = Im(h_{01} \cdot h^*_{00} + h_{11} h^*_{10}),\ Re\ \Delta E = Re(h_{01} \cdot h^*_{00} + h_{11} h^*_{10}),$$

$$\Delta E_0 = Re\ \Delta E + Im\ \Delta E,\ \Delta E_1 = Re\ \Delta E - Im\ \Delta E \quad (37)$$

(c) Determining the Imaginary Portion $d_{Im}=Im(D_0)$ of the Symbol $D_0$ Received by the First Receiver REC0

The probability $P(d_{Im}=+1)$ that the received bit $d_{Im}=+1$, and the probability $P(d_{Im}=-1)$ that the received bit $d_{Im}=-1$ can be expressed by the following equations from Table 2 and Table 3.

$$P(d_{Im}=+1)=P(S_0)P(S_{16})+P(S_1)P(S_{17})+P(S_2)P(S_{18})+P(S_3)P(S_{19})+$$

$$P(S_8)P(S_{24})+P(S_9)P(S_{25})+P(S_{10})P(S_{26})+P(S_{11})P(S_{27}) \quad (38)$$

$$P(d_{Im}=-1)=P(S_4)P(S_{20})+P(S_5)P(S_{21})+P(S_6)P(S_{22})+P(S_7)P(S_{23})+$$

$$P(S_{12})P(S_{28})+P(S_{13})P(S_{29})+P(S_{14})P(S_{30})+P(S_{15})P(S_{13}) \quad (39)$$

By finding the ln function of equations (38) and (39), the decision rule of equation (15) can be given by the following equation. In other words, the decision rule is as below.

$$\ln P(d_{Im}=+1/(y_0(t), y_1(t))) - \ln P(d_{Im}=-1/(y_0(t), y_1(t))) = \ln P_0(Q) =$$

$$4Im(y_0(t) h^*_{00} + y_1(t) h^*_{10}) + 0.5(L_1 - L_2 + L_3 - L_4) + \ln ch\{0.5(f_1 + f_2)\} - \ln ch\{0.5(f_3 + f_4)\} \quad (40)$$

In equation (40)

$$L_1 = \begin{pmatrix} \ln ch\{0.5(4Im(y_0(t)h^*_{01} + y_1(t)h^*_{11}) - (4Im(h_{00}h^*_{01} + h_{10}h^*_{11}) + 4Re(h_{00}h^*_{01} + h_{10}h^*_{11})))\} - \\ \ln ch\{0.5(4Im(y_0(t)h^*_{01} + y_1(t)h^*_{11}) + (4Im(h_{00}h^*_{01} + h_{10}h^*_{11}) - 4Re(h_{00}h^*_{01} + h_{10}h^*_{11})))\} \end{pmatrix} \quad (41a)$$

$$L_2 = \begin{pmatrix} \ln ch\{0.5(4Im(y_0(t)h^*_{01} + y_1(t)h^*_{11}) - (4Re(h_{00}h^*_{01} + h_{10}h^*_{11}) - 4Im(h_{00}h^*_{01} + h_{10}h^*_{11})))\} - \\ \ln ch\{0.5(4Im(y_0(t)h^*_{01} + y_1(t)h^*_{11}) - (4Re(h_{00}h^*_{01} + h_{10}h^*_{11}) + 4Im(h_{00}h^*_{01} + h_{10}h^*_{11})))\} \end{pmatrix} \quad (41b)$$

-continued $$L_3 = \begin{pmatrix} \ln ch\{0.5(4\text{Re}(y_0(t)h^*_{01} + y_1(t)h^*_{11}) - (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Re}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (41c)$$

$$L_4 = \begin{pmatrix} \ln ch\{0.5(4\text{Re}(y_0(t)h^*_{01} + y_1(t)h^*_{11}) + (4\text{Re}(h_{00}h^*_{01} + h_{10}h^*_{11}) + 4\text{Im}(h_{00}h^*_{01} + h_{10}h^*_{11})))\} - \\ \ln ch\{0.5(4\text{Re}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (41d)$$

$$f_1 = \begin{pmatrix} \ln ch\{0.5(4\text{Im}(y_0(t)h^*_{01} + y_1(t)h^*_{11}) - (4\text{Re}(h_{00}h^*_{01} + h_{10}h^*_{11}) + 4\text{Im}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} \end{pmatrix} \quad (41e)$$

$$f_2 = \begin{pmatrix} \ln ch\{0.5(4\text{Re}(y_0(t)h^*_{01} + y_1(t)h^*_{11}) + (4\text{Im}(h_{00}h^*_{01} + h_{10}h^*_{11}) - 4\text{Re}(h_{00}h^*_{01} + h_{10}h^*_{11})))\} - \\ \ln ch\{0.5(4\text{Re}(y_0(t)h^*_{01} + y_1(t)h^*_{11}) + (4\text{Im}(h_{00}h^*_{01} + h_{10}h^*_{11}) - 4\text{Re}(h_{00}h^*_{01} + h_{10}h^*_{11})))\} \end{pmatrix} \quad (41f)$$

$$f_3 = \begin{pmatrix} \ln ch\{0.5(4\text{Im}(y_0(t)h^*_{01} + y_1(t)h^*_{11}) + (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Im}(y_0(t)h^*_{01} + y_1(t)h^*_{11}) + (4\text{Re}(h_{00}h^*_{01} + h_{10}h^*_{11}) + 4\text{Im}(h_{00}h^*_{01} + h_{10}h^*_{11})))\} \end{pmatrix} \quad (41g)$$

$$f_4 = \begin{pmatrix} \ln ch\{0.5(4\text{Re}(y_0(t)h^*_{01} + y_1(t)h^*_{11}) - (4\text{Re}(h_{00}h^*_{01} + h_{10}h^*_{11}) - 4\text{Im}(h_{00}h^*_{01} + h_{10}h^*_{11})))\} - \\ \ln ch\{0.5(4\text{Re}(y_0(t)h^*_{01} + y_1(t)h^*_{11}) - (4\text{Re}(h_{00}h^*_{01} + h_{10}h^*_{11}) + 4\text{Im}(h_{00}h^*_{01} + h_{10}h^*_{11})))\} \end{pmatrix} \quad (41h)$$

In the above equations, ln of ln ch is the logarithm, and ch is cos h (hyperbolic cosine).

Here, new notation is employed. In other words, the first notation is as below.

$$S_0 = Re\{k(y_0 \cdot h^*_{01} + y_1 h^*_{11})\}, S_1 = Im\{k(y_0 \cdot h^*_{00} + y_1 h^*_{10})\}$$

$$S_2 = Re\{k(y_0 \cdot h^*_{00} + y_1 h^*_{10})\}, S_3 = Im\{k(y_0 \cdot h^*_{01} + y_1 h^*_{11})\} \quad (42)$$

Figure 10:
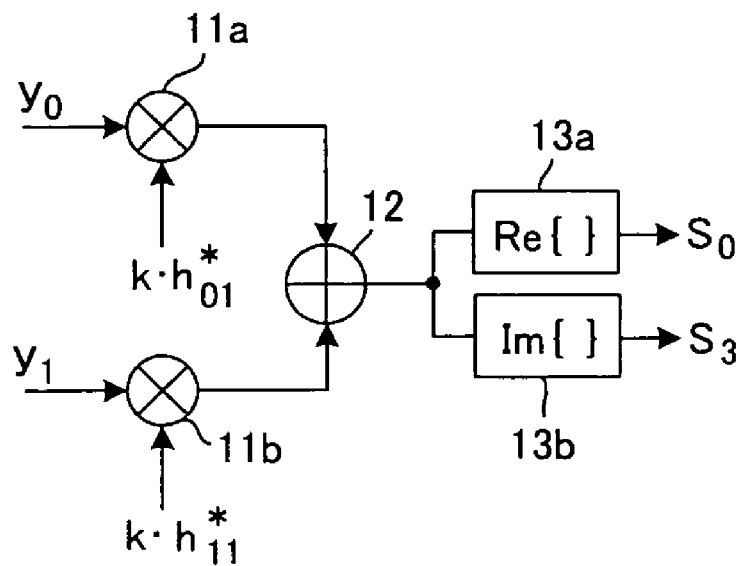
FIG. 10 shows the configuration of the generation unit for input signals S0 to S4 that are input to the non-linear element.
Figure 10:
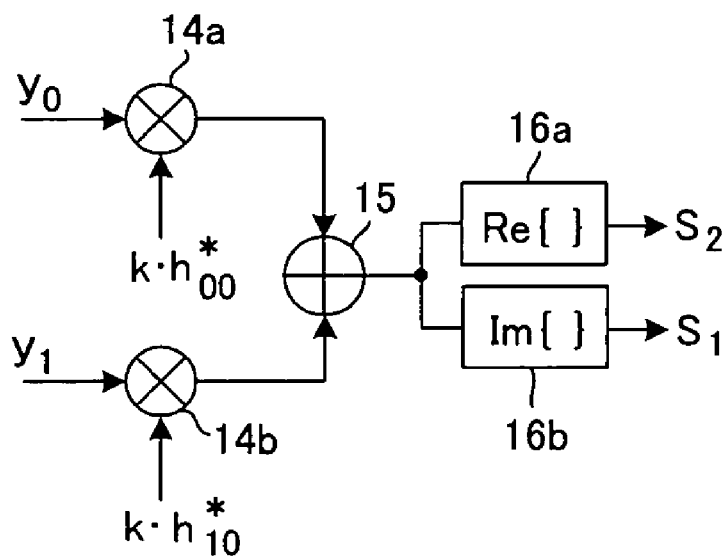

As shown in (A) of FIG. 10, the signals $S_0$, $S_3$ in this notation can be calculated using a multiplier 11a that multiplies the received signal $y_0$ by $k \cdot h_{01}^*$, a multiplier 11b that multiplies the received signal $y_1$ by $k \cdot h_{11}^*$, an adder 12 that adds the products from each of the multipliers, a real-number-extraction unit 13a that extracts the real-number portion from the added result, and an imaginary-number-extract ion unit 13b that extracts the imaginary portion. Also, as shown in (B) of FIG. 10, the signals $S_1$, $S_2$ can be calculated using a multiplier 14a that multiplies the received signal $y_0$ by $k \cdot h_{00}^*$, a multiplier 14b that multiplies the received signal $y_1$ by $k \cdot h_{10}^*$, an adder 15 that adds the products from each of the multipliers, a real-number-extraction unit 16a that extracts the real-number portion from the added result, and an imaginary-number-extraction unit 16b that extracts the imaginary portion.

The second notation is as below.

$$Im\, \Delta E = Im(h_{01} \cdot h^*_{00} + h_{11} h^*_{10}), Re\, \Delta E = Re(h_{01} \cdot h^*_{00} + h_{11} h^*_{10}),$$

$$\Delta E_0 = Re\, \Delta E + Im\, \Delta E, \Delta E_1 = Re\, \Delta E - Im\, \Delta E \quad (43)$$

Figure 11:
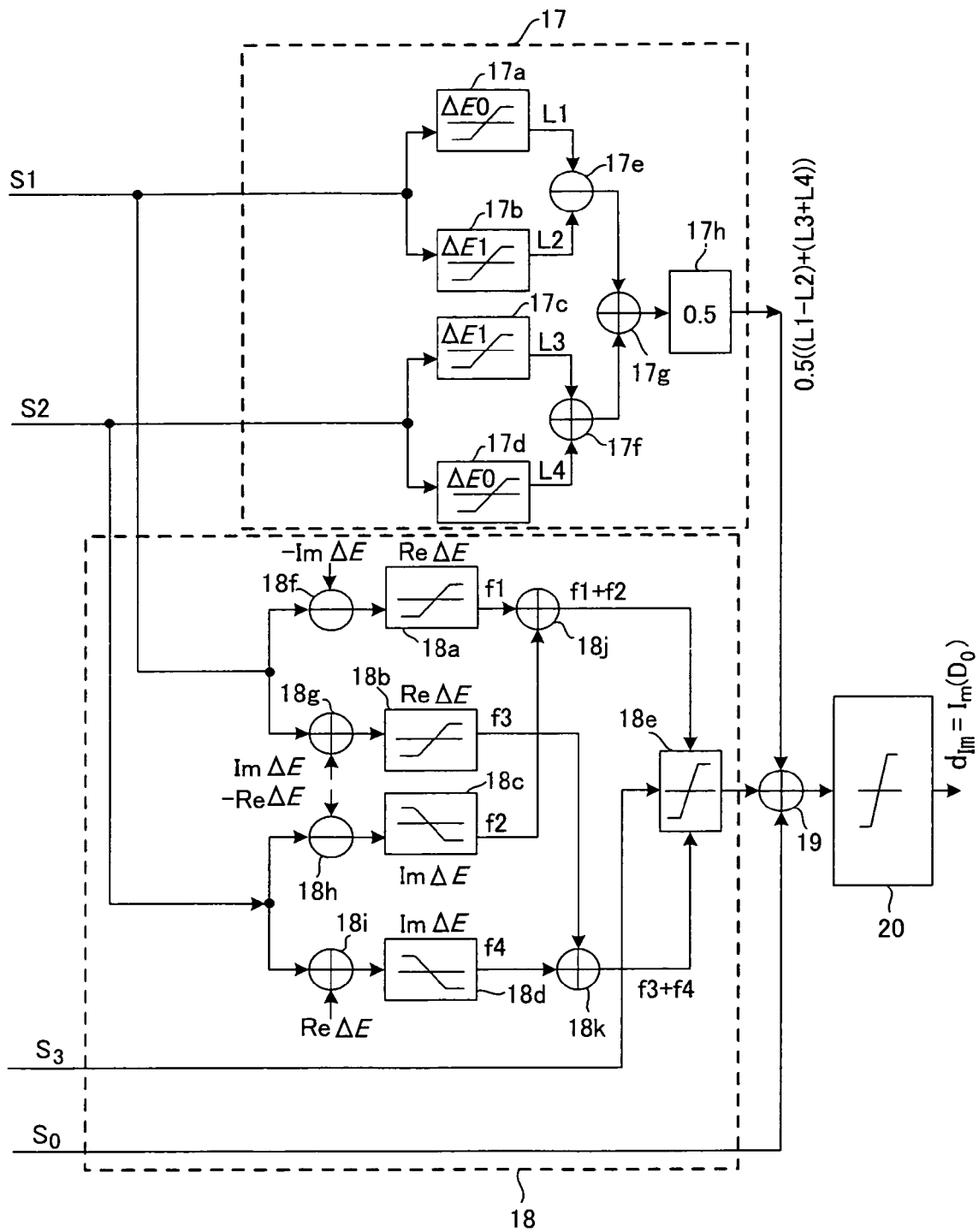
FIG. 11 shows the configuration of the signal-processing unit that determines whether or not the imaginary number portion of the first symbol $D_0$ is +1 or −1.

FIG. 11 shows the configuration of the signal-processing unit PR0 that calculates $\ln P_0(Q)$ based on equation (40), then uses this $\ln P_0(Q)$ to determine whether or not the imaginary-number portion of the first symbol $D_0$ is +1 or −1, and outputs the judgment result $d_{Im} = Im(D_0)$. However, the normalization factor k is taken to be $4/N_0$ ($N_0$ is the spectrum strength of the Gauss noise).

The signal-processing unit PR0 shown in FIG. 11 is created taking into consideration the notation of (42) and (43) above, and the non-linear function of equation (32), where 17a to 17d, and 18a to 18e in blocks 17 and 18 are limiters having the specified energy difference shown in FIG. 7.

Block 17 calculates the second term on the right of equation (40) ($L_1 - L_2 + L_3 + L_4$), and block 18 calculates the third and fourth terms on the right of equation (40), and the adder 19 calculates and outputs the following.

$$\ln P_0(Q) = \ln P(d_{Im} = +1/(y_0(t), y_1(t))) - \ln P(d_{Im} = -1/(y_0(t), y_1(t))) \quad (44)$$

In block 17, 17e is a subtractor, 17f to 17g are addesr, and 17h is a multiplier, in block 18, 18f to 18k are adders/subtractors. The judgment unit 20 determines whether or not the imaginary-number portion of the first symbol $D_0$ is +1 or −1 based on the probability $\ln P_0(Q)$, and outputs the judgment result $d_{Im} = Im(D_0)$.

(d) Determining the Imaginary-Number Portion $d_{Im} = Im(D_1)$ of the Second Symbol $D_1$ Determining the imaginary-number portion $d_{Im} = Im(D_1)$ of the second symbol $D_1$ can be performed in the same way as determining the imaginary-number portion of the first symbol $D_0$. The following equations can be used as $S_0$ to $S_3$ in FIG. 11.

$$S_0 = Im\{k \cdot (y_0 \cdot h^*_{01} + y_1 \cdot h^*_{11})\}, S_1 = Im\{k \cdot (y_0 \cdot h^*_{00} + y_1 \cdot h^*_{10})\}$$

$$S_2 = Re\{k \cdot (y_0 \cdot h^*_{00} + y_1 \cdot h^*_{10})\}, S_3 = Re\{k \cdot (y_0 \cdot h^*_{01} + y_1 \cdot h^*_{11})\} \quad (45)$$

Also, the following equations can be used as $Im\Delta E$, $Re\Delta E$, $\Delta E_0$ and $\Delta E_1$.

$$Im\, \Delta E = Im(k \cdot (h_{01} \cdot h^*_{00} + h_{11} \cdot h^*_{10})), Re\, \Delta E = Re(k \cdot (h_{01} \cdot h^*_{00} + h_{11} \cdot h^*_{10})), \Delta E_0 = Re\, \Delta E + Im\, \Delta E,$$

$$\Delta E_1 = Re\, \Delta E - Im\, \Delta E \quad (46)$$

(e) BPSK Transmission

The case of QPSK transmission was explained above, however in the case of BPSK transmission, the symbols are only the real-number portion, and a circuit for determining the imaginary-number portion is not necessary.

In other words, $D_i = (d_{Re}, d_{Im})$ becomes just the real-number portion, so $d_{Re} = Re(D_i)$, and $d_{Im} = 0$. Also, in the equations above, the imaginary terms $Im(\cdot)$ all become 0.

(f) Simulation

Figure 12:
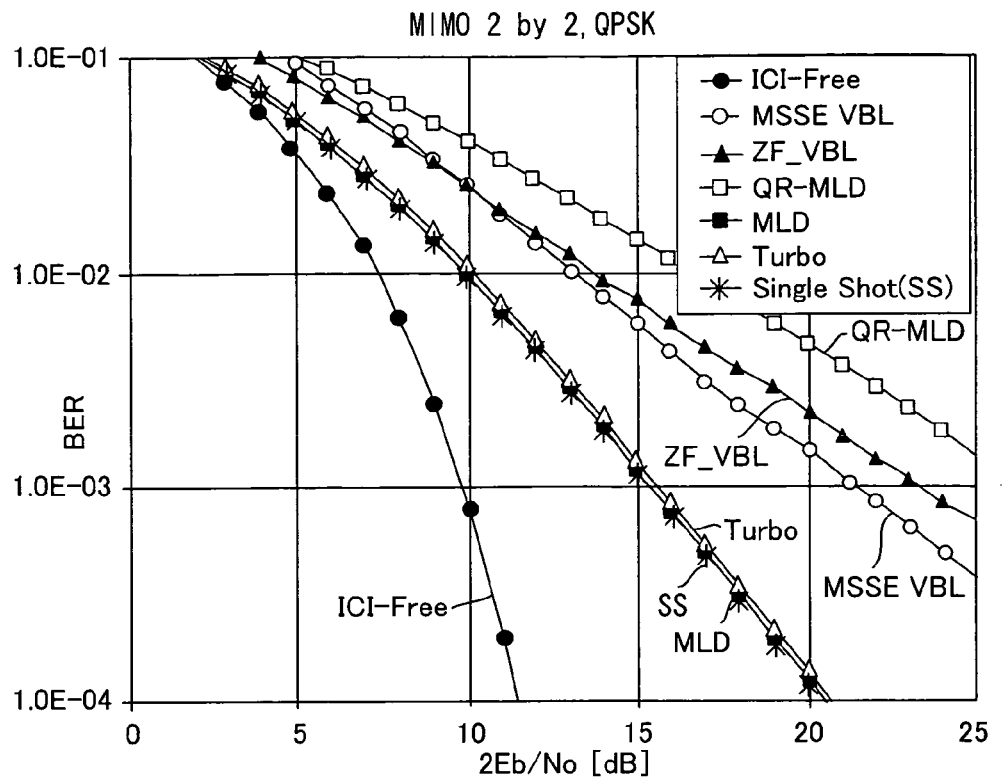
FIG. 12 shows the BER characteristic for the SS receiver of this invention for the case in which QPSK modulation is performed.
Figure 13:
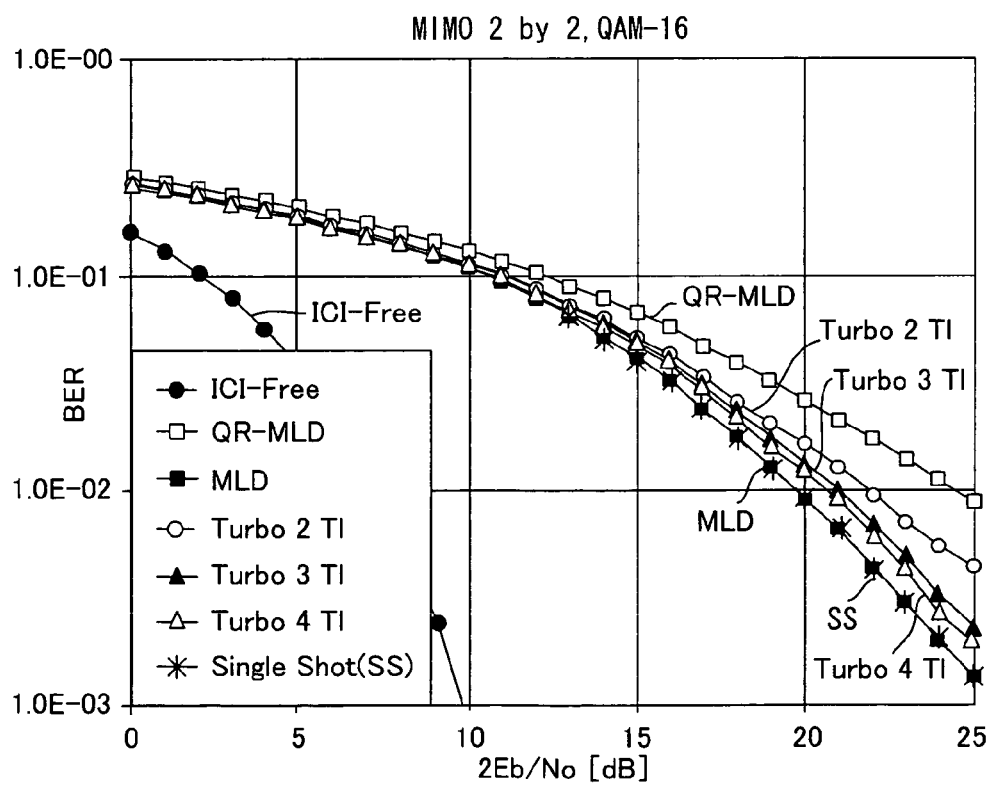
FIG. 13 shows the BER characteristic for the SS receiver of this invention for the case in which 16 QAM modulation is performed.

FIG. 12 and FIG. 13 show the BER (Bit Error Rate) for 2Eb/No, which is the BER characteristic of the SS receiver of this invention. In the simulation, two transmission antennas and two receiving antennas are used, and transmission is performed using QPSK modulation or 16QAM modulation without encoding. FIG. 12 shows the case of using QPSK modulation, and FIG. 13 shows the case of using 16QAM modulation, and it was found that a characteristic similar to the BER characteristic of the MLD method is obtained.

From the simulation results shown in FIG. 12, the BER characteristic of the SS receiver of this invention has no SNR loss when compared with the MLD characteristic. Also, as can be seen from the results shown in FIG. 12 and FIG. 13, the SS algorithm of this invention has the same BER characteristic as MLD, and is +6 dB better than the characteristic obtained using the QR-MLD method. With the SS receiver, a characteristic that is +6 dB better than that obtained using QR-MLD method is obtained, and as can be clearly seen from the following analysis, complexity equivalent to that of the QR-MLD method can be expected.

The SS receiver of this invention has better performance than a turbo receiver, and complexity and processing time are improved. Particularly, the advantage of the SS receiver when compared with the turbo receiver is that iterative estimation is not necessary. In order for a turbo receiver to obtain the best performance, 2 to 4 iterations are necessary.

(g) Circuit Complexity

Table 4 to Table 6 show the number of complex computations and the number of real-number computations when the transmitter uses QPSK modulation, and Table 3 shows the case of a MLD receiver, Table 4 shows the case of a QR-MLD receiver, and Table 5 shows the case of the SS receiver of this invention. In the tables, the top row shows the number of complex computations and real-number computations, and the bottom row is the total number of real-number computations when the number of complex computations is replaced with the number of real-number computations. One complex multiplication is according to the following equation $$(a+i \cdot b) \cdot (c+i \cdot d) = a \cdot c + i \cdot a \cdot d + i \cdot b \cdot c - b \cdot d \quad (47)$$

and corresponds to four real-number multiplications, two real-number additions, and one real-number subtraction. Moreover, complex addition/subtraction corresponds to two real-number additions/subtractions. Furthermore, two real-number multiplications and one addition/subtraction are necessary for a complex norm computation. The complex norm computation when $y = Re + jIm$ is a value calculated using the following equation.

$$\text{Norm} = \sqrt{Re \cdot Re + Im \cdot Im}$$

TABLE 4

| MLD | | | |
|---|---|---|---|
| Complex MULT | Complex ADD/Compare | Complex Norm | Real ADD/Compare |
| 16 Or Real MULT 96 | 16 Or Real ADD 112 | 16 | 16 |

TABLE 5

| QR-MLD | | | |
|---|---|---|---|
| Complex MULT | Complex ADD/Compare | Complex Norm | Real ADD/Compare |
| 25 Or Real MULT 116 | 16 Or Real ADD 121 | 8 | 6 |

TABLE 6

| SS | | | |
|---|---|---|---|
| Complex MULT | Real MULT | Real ADD/Compare | Real ADD | Real ADD |
| 6 Or Real MULT 27 | 3 | 16 Or Real ADD 104 | 18 * 2 = 36 16 + 36 + 28 | 14 * 2 = 28 |

The MLD method is a method that generates candidates (replicas) for $Q^M$ transmission vectors, and performs the distance computation of equation (5), then estimates that the replica having the minimum distance is the input data, and in this method the number of computations increases exponentially according to the number of antennas M. Here, Q is the modulation method, and in the case of BPSK modulation, Q=2, and in the case of QPSK, Q=4.

Table 9 show the number of complex computations and real-number computations in the case where the transmitter uses 16QAM modulation, where Table 7 is for the case of a MLD receiver, Table 8 is for the case of a QR-MLD receiver, and Table 9 is for the case of the SS receiver of this invention.

TABLE 7

| MLD | | | |
|---|---|---|---|
| Complex MULT | Complex ADD/Compare | Complex Norm | Real ADD/Compare |
| 256 Or Real MULT 1536 | 256 Or Real ADD 1792 | 256 | 256 |

TABLE 8

| QR-MLD | | | |
|---|---|---|---|
| Complex MULT | Complex ADD/Compare | Complex Norm | Real ADD/Compare |
| 49 Or Real MULT 260 | 40 Or Real ADD 289 | 32 | 30 |

TABLE 9

| SS | | | |
|---|---|---|---|
| Complex MULT | Real MULT | Real ADD/Compare | Real ADD (* Non-optimized) |
| 8 Or Real MULT 40 | 8 | 21 Or Real ADD 3500 | 2 * 1700 = 3400 |

As can be seen from the above, with the SS receiver of this invention, only a few multiplications are necessary when compared with the MLD method or QR-MLD method. In ASIC or FPGA implementation, an 8-bit real-number multiplier is 10× or more complex than real-number addition, and for M real-number multiplications, the complexity is equivalent to 10×M real-number additions. By using this comparison rule, the complexity of the SS receiver of this invention using QPSK modulation is much less than in the QR-MLD method. However, in the case of 16QAM modulation, the SS receiver of this invention requires more operations than in the QR-MLD method. In other words, when the SS receiver of this invention requires approximately 3,900 additions, then 2,900 additions are required in the QR-MLD method.

Here a non-optimized SS receiver is assumed, so in the future there is a possibility of reducing the complexity of a few SS receivers, and there is a possibility of reducing the number of real-number additions to 400 to 600.

With the invention described above, the respective receiver for each of a plurality of receiving antennas uses a received signal that was received by the receiving antenna that is connected to it, as well as the received signals that were received by other receiving antennas, to calculate the probability of the signal that was transmitted from a specified transmitter, and then by judging the signal that was transmitted by that transmitter based on the calculated probability, is capable of improving the BER characteristic without having to perform iterative computations as in the case of a turbo receiver, so it is possible to improve the amount of computations, computation time and complexity.

Also, since the probability-computation unit comprises a plurality of non-linear processing circuits that have a transfer function as an amplitude limiter, and a combining circuit that combines the output from a plurality of non-linear processing circuits, the SS receiver can be constructed easily.

(c) Appendix

From equations (22), (24), (26) and (28), the linear portion of the decision rule equation of equation (15) can be expressed by equation (48) below.

$$0.25(\ln P(S_0)+\ln P(S_{16})+\ln P(S_1)+\ln P(S_{17})+\ln P(S_2)+\ln P(S_{18})+\ln P(S_3)+\ln P(S_{19}))+$$

$$0.25(\ln P(S_4)+\ln P(S_{20})+\ln P(S_5)+\ln P(S_{21})+\ln P(S_6)+\ln P(S_{22})+\ln P(S_7)+\ln P(S_{23}))-$$

$$0.25(\ln P(S_8)+\ln P(S_{24})+\ln P(S_9)+\ln P(S_{25})+\ln P(S_{10})+\ln P(S_{26})+\ln P(S_{11})+\ln P(S_{27}))-$$

$$0.25(\ln P(S_{12})+\ln P(S_{28})+\ln P(S_{13})+\ln P(S_{29})+\ln P(S_{14})+\ln P(S_{30})+\ln P(S_{15})+\ln P(S_{31}))=$$

$$4\,Re\{y_0(t)h^*_{00}+y_1(t)h^*_{10}\} \quad (48)$$

The following equations are established for the non-linear higher-order elements in the receiver REC0.

1) First-Order Difference $$\ln P(S_0)-\ln P(S_1)=4Im\{y_0(t)h^*_{01}\}-4Im\{S^*_{00}h_{00}h^*_{01}\}$$

$$\ln P(S_2)-\ln P(S_3)=4Im\{y_0(t)h^*_{01}\}-4Im\{S^*_{00}h_{00}h^*_{01}\}$$

$$\ln P(S_4)-\ln P(S_5)=4Im\{y_0(t)h^*_{01}\}-4Im\{S^*_{01}h_{00}h^*_{01}\}$$

$$\ln P(S_6)-\ln P(S_7)=4Im\{y_0(t)h^*_{01}\}-4Im\{S^*_{01}h_{00}h^*_{01}\}$$

$$\ln P(S_8)-\ln P(S_9)=4Im\{y_0(t)h^*_{01}\}-4Im\{S^*_{01}h_{00}h^*_{01}\}$$

$$\ln P(S_{10})-\ln P(S_{11})=4Im\{y_0(t)h^*_{01}\}-4Im\{S^*_{01}h_{00}h^*_{01}\}$$

$$\ln P(S_{12})-\ln P(S_{13})=4Im\{y_0(t)h^*_{01}\}-4Im\{S^*_{00}h_{00}h^*_{01}\}$$

$$\ln P(S_{14})-\ln P(S_{15})=4Im\{y_0(t)h^*_{01}\}-4Im\{S^*_{00}h_{00}h^*_{01}\} \quad (49)$$

2) Second-Order Difference $$0.5((\ln P(S_0)+\ln P(S_1))-(\ln P(S_2)+\ln P(S_3)))=4\,Re\{y_0(t)h^*_{01}\}-4\,Re\{h_{00}S^*_{00}h^*_{01}\}$$

$$0.5((\ln P(S_4)+\ln P(S_5))-(\ln P(S_6)+\ln P(S_7)))=4\,Re\{y_0(t)h^*_{01}\}-4\,Re\{h_{00}S^*_{00}h^*_{01}\}$$

$$0.5((\ln P(S_8)+\ln P(S_9))-(\ln P(S_{10})+\ln P(S_{11})))=4\,Re\{y_0(t)h^*_{01}\}-4\,Re\{h_{00}S^*_{01}h^*_{01}\}$$

$$0.5((\ln P(S_{12})+\ln P(S_{13}))-(\ln P(S_{14})+\ln P(S_{15})))=4\,Re\{y_0(t)h^*_{01}\}-4\,Re\{h_{00}S^*_{01}h^*_{01}\} \quad (50)$$

Similarly, the following equations are established for the non-linear higher-order elements in the receiver REC1.

1) First-Order Difference $$\ln P(S_{16})-\ln P(S_{17})=4\,Im\{y_1(t)h^*_{11}\}-4\,Im\{S^*_{00}h_{10}h^*_{11}\}$$

$$\ln P(S_{18})-\ln P(S_{19})=4\,Im\{y_1(t)h^*_{11}\}-4\,Im\{S^*_{00}h_{10}h^*_{11}\}$$

$$\ln P(S_{20})-\ln P(S_{21})=4\,Im\{y_1(t)h^*_{11}\}-4\,Im\{S^*_{01}h_{10}h^*_{11}\}$$

$$\ln P(S_{22})-\ln P(S_{23})=4\,Im\{y_1(t)h^*_{11}\}-4\,Im\{S^*_{01}h_{10}h^*_{11}\}$$

$$\ln P(S_{24})-\ln P(S_{25})=4\,Im\{y_1(t)h^*_{11}\}-4\,Im\{S^*_{00}h_{10}h^*_{11}\}$$

$$\ln P(S_{26})-\ln P(S_{27})=4\,Im\{y_1(t)h^*_{11}\}-4\,Im\{S^*_{00}h_{10}h^*_{11}\}$$

$$\ln P(S_{28})-\ln P(S_{28})=4\,Im\{y_1(t)h^*_{11}\}-4\,Im\{S^*_{01}h_{10}h^*_{11}\}$$

$$\ln P(S_{30})-\ln P(S_{31})=4\,Im\{y_1(t)h^*_{11}\}-4\,Im\{S^*_{01}h_{10}h^*_{11}\} \quad (51)$$

2) Second-Order Difference $$0.5((\ln P(S_{16})+\ln P(S_{17}))-(\ln P(S_{18})+\ln P(S_{19})))=4\,Re\{y_1(t)h^*_{11}\}-4\,Re\{h_{10}S^*_{00}h^*_{11}\}$$

$$0.5((\ln P(S_{20})+\ln P(S_{21}))-(\ln P(S_{22})+\ln P(S_{23})))=4\,Re\{y_1(t)h^*_{11}\}-4\,Re\{h_{10}S^*_{00}h^*_{11}\}$$

$$0.5((\ln P(S_{24})+\ln P(S_{25}))-(\ln P(S_{26})+\ln P(S_{27})))=4\,Re\{y_1(t)h^*_{11}\}-4\,Re\{h_{10}S^*_{01}h^*_{11}\}$$

$$0.5((\ln P(S_{28})+\ln P(S_{29}))-(\ln P(S_{30})+\ln P(S_{31})))=4\,Re\{y_1(t)h^*_{11}\}-4\,Re\{h_{10}S^*_{01}h^*_{11}\} \quad (52)$$

Also, equations (17) and (18) are simplified using the following equation.

$$\ln\left\{\cosh\left[0.5\left(\begin{array}{c}0.25\left(\begin{array}{c}\ln P(S_0)+\ln P(S_{16})+\ln P(S_1)+\ln P(S_{17})-\\ \ln P(S_2)-\ln P(S_{18})-\ln P(S_3)-\ln P(S_{19})\end{array}\right)+\\ 0.5(\ln\{\cosh[0.5(\ln P(S_0)+\ln P(S_{16})-\ln P(S_1)-\ln P(S_{17}))]\})-\\ 0.5(\ln\{\cosh[0.5(\ln P(S_2)+\ln P(S_{18})-\ln P(S_3)-\ln P(S_{19}))]\})\end{array}\right)\right]\right\}= \quad (53)$$

$$\ln\{\cosh[0.5(0.5(\ln P(S_0)+\ln P(S_{16})-\ln P(S_2)-\ln P(S_{18})))]\}$$

Similar simplification is also possible for other elements.

From the above, an equation that subtracts the non-linear element of the third term on the right of equation (28) from the non-linear element of the third term on the right of equation (22) are given by the following equation.

$$0.5(\ln\{\cosh[0.5(\ln P(S_0) + \ln P(S_{16}) - \ln P(S_1) - \ln P(S_{17}))]\}) - \quad (54)$$
$$0.5(\ln\{\cosh[0.5(\ln P(S_{12}) + \ln P(S_{28}) - \ln P(S_{13}) - \ln P(S_{29}))]\}) =$$
$$0.5\left(\ln\left\{\cosh\left[0.5\binom{4\text{Im}\{y_0(t)h_{01}^*\} - 4\text{Im}\{S_{00}^*h_{00}h_{01}^*\} +}{4\text{Im}\{y_1(t)h_{11}^*\} - 4\text{Im}\{S_{00}^*h_{10}h_{11}^*\}}\right]\right\}\right) -$$
$$0.5\left(\ln\left\{\cosh\left[0.5\binom{4\text{Im}\{y_0(t)h_{01}^*\} + 4\text{Im}\{S_{00}^*h_{00}h_{01}^*\} +}{4\text{Im}\{y_1(t)h_{11}^*\} + 4\text{Im}\{S_{00}^*h_{10}h_{11}^*\}}\right]\right\}\right)$$

Here, by rewriting the equation taking into consideration the following equation, $$Im\{S^*_{00}h_{00}h^*_{01}\} = Re\{h_{00}h_{01}\} + Im\{h_{00}h_{01}\} \quad (55)$$

equation (56) is obtained.

$$L_1 = \begin{pmatrix} \ln ch\{0.5(4\text{Im}(y_0(t)h_{01}^* + y_1(t)h_{11}^*) - (4\text{Re}(h_{00}h_{01}^* + h_{10}h_{11}^*) + 4\text{Im}(h_{00}h_{01}^* + h_{10}h_{11}^*)))\} - \\ \ln ch\{0.5(4\text{Im}(y_0(t)h_{01}^* + y_1(t)h_{11}^*) + (4\text{Re}(h_{00}h_{01}^* + h_{11}h_{11}^*) + 4\text{Im}(h_{00}h_{01}^* + h_{10}h_{11}^*)))\} \end{pmatrix} \quad (56)$$

Similarly, $L = \{L_1, L_2, L_3, L_4\}$ is obtained.

Next, $f = \{f_1, f_2, f_3, f_4\}$ will be explained.

When considering the non-linear portion of equation (17)

$$\ln\left\{\cosh\begin{bmatrix} 0.5(\ln(P(S_0)P(S_{16}) + P(S_1)P(S_{17}) + P(S_2)P(S_{18}) + P(S_3)P(S_{19}))) - \\ 0.5(\ln(P(S_4)P(S_{20}) + P(S_5)P(S_{21}) + P(S_6)P(S_{22}) + P(S_7)P(S_{23}))) \end{bmatrix}\right\} \quad (57)$$

the following equation is established.

$$\ln(P(S_0)P(S_{16}) + P(S_1)P(S_{17}) + P(S_2)P(S_{18}) + P(S_3)P(S_{19})) = \quad (58)$$
$$0.25(\ln P(S_0) + \ln P(S_{16}) + \ln P(S_1) + \ln P(S_{17}) +$$
$$\ln P(S_2) + \ln P(S_{18}) + \ln P(S_3) + \ln P(S_{19})) + \ln 2 +$$
$$0.5\left(\begin{array}{l}\ln\cosh\{0.5(\ln P(S_0) + \ln P(S_{16}) - \ln P(S_1) - \ln P(S_{17}))\} + \\ \ln\cosh\{0.5(\ln P(S_2) + \ln P(S_{18}) - \ln P(S_3) - \ln P(S_{19}))\}\end{array}\right) +$$
$$\ln 2 + \ln\cosh$$
$$\left\{0.5\left(\begin{array}{l}0.25\binom{\ln P(S_0) + \ln P(S_{16}) + \ln P(S_1) + \ln P(S_{17}) -}{\ln P(S_2) - \ln P(S_{18}) - \ln P(S_3) - \ln P(S_{19})} + \\ 0.50\binom{\ln\cosh\{0.5(\ln P(S_0) + \ln P(S_{16}) - \ln P(S_1) - \ln P(S_{17}))\} -}{\ln\cosh\{0.5(\ln P(S_2) + \ln P(S_{18}) - \ln P(S_3) - \ln P(S_{19}))\}}\end{array}\right)\right\}$$

Similarly, the following equation is established.

$$(\ln(P(S_4)P(S_{20}) + P(S_5)P(S_{21}) + P(S_6)P(S_{22}) + P(S_7)P(S_{23}))) = \quad (59)$$
$$0.25(\ln P(S_4) + \ln P(S_{20}) + \ln P(S_5) + \ln P(S_{21}) +$$
$$\ln P(S_6) + \ln P(S_{22}) + \ln P(S_7) + \ln P(S_{23})) + \ln 2 +$$
$$0.5(\ln\{\cosh[0.5(\ln P(S_4) + \ln P(S_{20}) - \ln P(S_5) - \ln P(S_{21}))]\}) +$$
$$0.5(\ln\{\cosh[0.5(\ln P(S_6) + \ln P(S_{22}) - \ln P(S_7) - \ln P(S_{23}))]\}) +$$
$$\ln 2 + \ln$$
$$\left[h\left|0.5\left(\begin{array}{l}0.25\binom{\ln P(S_4) + \ln P(S_{20}) + \ln P(S_5) + \ln P(S_{21}) -}{\ln P(S_6) - \ln P(S_{22}) - \ln P(S_7) - \ln P(S_{23})} + \\ 0.5(\ln\{\cosh[0.5(\ln P(S_4) + \ln P(S_{20}) - \ln P(S_5) - \ln P(S_{21}))]\}) - \\ 0.5(\ln\{\cosh[0.5(\ln P(S_6) + \ln P(S_{22}) - \ln P(S_7) - \ln P(S_{23}))]\})\end{array}\right)\right|\right]$$

Lin1, Lin2 and Lin in equations (58) and (59) are defined as follows.

$Lin1 = 0.25(\ln P(S_0) + \ln P(S_{16}) + \ln P(S_1) + \ln P(S_{17}) + \ln P(S_2) + \ln P(S_{18}) + \ln P(S_3) + \ln P(S_{19}))$ $Lin2 = 0.25(\ln P(S_4) + \ln P(S_{20}) + \ln P(S_5) + \ln P(S_{21}) + \ln P(S_6) + \ln P(S_{22}) + \ln P(S_7) + \ln P(S_{23}))$ $$Lin = Lin1 - Lin2 \quad (60)$$

Also, the following equations are established for the receivers REC0, REC1.

$\ln P(S_0) - \ln P(S_4) = 4\, Im\{y_0(t)h^*_{00}\} + 4\, Im\{(S^*_{10})^* h_{00}h^*_{01}\}$ $\ln P(S_1) - \ln P(S_5) = 4\, Im\{y_0(t)h^*_{00}\} + 4\, Im\{(S^*_{11})^* h_{00}h^*_{01}\}$ $\ln P(S_2) - \ln P(S_6) = 4\, Im\{y_0(t)h^*_{00}\} - 4\, Im\{(S^*_{11})^* h_{00}h^*_{01}\}$ $\ln P(S_3) - \ln P(S_7) = 4\, Im\{y_0(t)h^*_{00}\} - 4\, Im\{(S^*_{10})^* h_{00}h^*_{01}\}$ $\ln P(S_{16}) - \ln P(S_{20}) = 4\, Im\{y_1(t)h^*_{10}\} + 4\, Im\{(S^*_{10})^* h_{10}h^*_{11}\}$ $\ln P(S_{17}) - \ln P(S_{21}) = 4\, Im\{y_1(t)h^*_{10}\} + 4\, Im\{(S^*_{11})^* h_{10}h^*_{11}\}$ $\ln P(S_{18}) - \ln P(S_{22}) = 4\, Im\{y_1(t)h^*_{10}\} - 4\, Im\{(S^*_{11})^* h_{10}h^*_{11}\}$ $\ln P(S_{19}) - \ln P(S_{23}) = 4\, Im\{y_1(t)h^*_{10}\} - 4\, Im\{(S^*_{10})^* h_{10}h^*_{11}\}$ (61)

Equation (62) is found from equation (61).

$\ln P(S_0) + \ln P(S_1) + \ln P(S_2) + \ln P(S_3) - \ln P(S_4) - \ln P(S_5) - \ln P(S_6) - \ln P(S_7) = 4*4\, Im\{y_0(t)h_{00}\}$ $\ln P(S_{16}) + \ln P(S_{17}) + \ln P(S_{18}) + \ln P(S_{19}) - \ln P(S_{20}) - \ln P(S_{21}) - \ln P(S_{22}) - \ln P(S_{23}) = 4*4\, Im\{y_1(t)h_{10}\}$ $$Lin = 4\, Im\{y_0(t)h_{00} + y_1(t)h_{10}\} \quad (62)$$

Considering the above, after simplifying all of the non-linear elements, the following equations can be obtained.

$$\ln ch\{0.5(f_1+f_2)\} - \ln ch\{0.5(f_3+f_4)\} \tag{63}$$

$$f_1 = \begin{pmatrix} \ln ch\{0.5(4\mathrm{Im}(y_0(t)h_{01}^* + y_1(t)h_{11}^*) - (4\mathrm{Im}(h_{00}h_{01}^* + h_{10}h_{11}^*) + \\ 4\mathrm{Re}(h_{00}h_{01}^* + h_{10}h_{11}^*)))\} - \\ \ln ch\{0.5(4\mathrm{Im}(y_0(t)h_{01}^* + y_1(t)h_{11}^*) + (4\mathrm{Re}(h_{00}h_{01}^* + h_{10}h_{11}^*) - \\ 4\mathrm{Im}(h_{00}h_{01}^* + h_{10}h_{11}^*)))\} \end{pmatrix}$$

$$f_2 = \begin{pmatrix} \ln ch\{0.5(4\mathrm{Re}(y_0(t)h_{01}^* + y_1(t)h_{11}^*) + (4\mathrm{Im}(h_{00}h_{01}^* + h_{10}h_{11}^*) - \\ 4\mathrm{Re}(h_{00}h_{01}^* + h_{10}h_{11}^*)))\} - \\ \ln ch\{0.5(4\mathrm{Re}(y_0(t)h_{01}^* + y_1(t)h_{11}^*) - (4\mathrm{Im}(h_{00}h_{01}^* + h_{10}h_{11}^*) + \\ 4\mathrm{Re}(h_{00}h_{01}^* + h_{10}h_{11}^*)))\} \end{pmatrix}$$

$$f_3 = \begin{pmatrix} \ln ch\{0.5(4\mathrm{Im}(y_0(t)h_{01}^* + y_1(t)h_{11}^*) - (4\mathrm{Re}(h_{00}h_{01}^* + h_{10}h_{11}^*) - \\ 4\mathrm{Im}(h_{00}h_{01}^* + h_{10}h_{11}^*)))\} - \\ \ln ch\{0.5(4\mathrm{Im}(y_0(t)h_{01}^* + y_1(t)h_{11}^*) + (4\mathrm{Re}(h_{00}h_{01}^* + h_{10}h_{11}^*) + \\ 4\mathrm{Im}(h_{00}h_{01}^* + h_{10}h_{11}^*)))\} \end{pmatrix}$$

$$f_4 = \begin{pmatrix} \ln ch\{0.5(4\mathrm{Re}(y_0(t)h_{01}^* + y_1(t)h_{11}^*) + (4\mathrm{Re}(h_{00}h_{01}^* + h_{10}h_{11}^*) + \\ 4\mathrm{Im}(h_{00}h_{01}^* + h_{10}h_{11}^*)))\} - \\ \ln ch\{0.5(4\mathrm{Re}(y_0(t)h_{01}^* + y_1(t)h_{11}^*) - (4\mathrm{Im}(h_{00}h_{01}^* + h_{10}h_{11}^*) - \\ 4\mathrm{Re}(h_{00}h_{01}^* + h_{10}h_{11}^*)))\} \end{pmatrix}$$

The following equation is obtained from equations (48), (56) and (63).

$$\ln P(d_{Re}=+1/(y_0(t),y_1(t))) - \ln P(d_{Re}=-1/(y_0(t),y_1(t))) = \ln P_0(I) =$$

$$4\,Re(y_0(t)h^*_{00} + y_1(t)h^*_{10}) + 0.5(L_1 - L_2 + L_3 + L_4) + \ln ch\{0.5(f_1 + f_{20})\} - \ln ch\{0.5(f_3 + f_4)\} \tag{64}$$

As many apparently widely different embodiments of the present invention can be made without departing from the spirit and scope thereof, it is to be understood that the invention is not limited to the specific embodiments thereof except as defined in the appended claims.

What is claimed is:

1. A wireless receiving apparatus comprising:
a plurality of receiving antennas that receive signals that are transmitted from a plurality of transmission antennas and input via a plurality of propagation paths having different propagation characteristics, and
receivers that correspond to each of said plurality of antennas; wherein
each receiver comprises:
a computation unit that uses a received signal that was received by the receiving antenna that is connected to it, and received signals that were received by the other receiving antennas, to calculate probability of a signal that was transmitted from a specified transmitter, and
a judgment unit that judges the signal that was transmitted from said transmitter based on said probability wherein
said computation unit calculates said probability using an equation that calculates said probability based on the posteriori probability that the signal transmitted from the transmitter is +1, and the posteriori probability that the signal transmitted from the transmitter is −1.

2. A wireless receiving apparatus comprising:
a plurality of receiving antennas that receive signals that are transmitted from a plurality of transmission antennas and input via a plurality of propagation paths having different propagation characteristics, and
receivers that correspond to each of said plurality of antennas; wherein
each receiver comprises:
a computation unit that uses a received signal that was received by the receiving antenna that is connected to it, and received signals that were received by the other receiving antennas, to calculate probability of a signal that was transmitted from a specified transmitter, and
a judgment unit that judges the signal that was transmitted from said transmitter based on said probability wherein
said computation unit comprises:
a plurality of non-linear-processing circuits having a transfer function as an amplitude limiter; and
a combining circuit that combines the output from the plurality of non-linear-processing circuits and outputs the probability of said transmitted signal.

3. The wireless receiving apparatus of claim 2 wherein
said computation unit further comprises:
a signal-generation unit that generates an input signal input to each of said non-linear-processing circuits based on the product of a specified received signal and specified propagation characteristic.

4. The wireless receiving apparatus of claim 2 wherein the limit level of said non-linear-processing circuits depends on said propagation characteristic.

5. A wireless receiving apparatus comprising:
a plurality of receiving antennas that receive signals that are transmitted from a plurality of transmission antennas and input via a plurality of propagation paths having different propagation characteristics, and
receivers that correspond to each of said plurality of antennas; wherein
each receiver comprises:
a computation unit that uses a received signal that was received by the receiving antenna that is connected to it, and received signals that were received by the other receiving antennas, to calculate probability of a signal that was transmitted from a specified transmitter, and
a judgment unit that judges the signal that was transmitted from said transmitter based on said probability wherein
when a transmission station transmits data using QPSK modulation, said computation units comprises:
first and second computation units that execute the aforementioned processing for the real-number portion and imaginary-number portion of the received signal; and
said judgment unit comprises first and second judgment units that execute the aforementioned processing for the real-number portion and imaginary-number portion of the received signal.

* * * * *